United States Patent
Bandikatla et al.

(10) Patent No.: US 12,303,924 B2
(45) Date of Patent: May 20, 2025

(54) ROBOTIC ASSISTED WALL PAINTING APPARATUS AND METHOD

(71) Applicant: Myro International Pte Ltd., Singapore (SG)

(72) Inventors: Puneeth Bandikatla, Hyderabad (IN); Nitesh Boyina, Hyderabad (IN); Akhil Varma, Hyderabad (IN); Srikar Reddy Mettu, Hyderabad (IN)

(73) Assignee: Myro International Pte Ltd., Singapore (SG)

( * ) Notice: Subject to any disclaimer, the term of this patent is extended or adjusted under 35 U.S.C. 154(b) by 409 days.

(21) Appl. No.: 17/790,757

(22) PCT Filed: May 11, 2021

(86) PCT No.: PCT/IN2021/050452
§ 371 (c)(1),
(2) Date: Jul. 5, 2022

(87) PCT Pub. No.: WO2021/255748
PCT Pub. Date: Dec. 23, 2021

(65) Prior Publication Data
US 2023/0032491 A1    Feb. 2, 2023

(30) Foreign Application Priority Data

Jun. 19, 2020 (IN) .............................. 202041025896

(51) Int. Cl.
*G05D 1/00* (2024.01)
*B05B 12/12* (2006.01)
(Continued)

(52) U.S. Cl.
CPC .......... *B05B 12/124* (2013.01); *B05B 12/122* (2013.01); *B05B 13/005* (2013.01);
(Continued)

(58) Field of Classification Search
CPC ... B05B 12/124; B05B 12/122; B05B 13/005; B05B 13/0421; B05B 12/02;
(Continued)

(56) References Cited

U.S. PATENT DOCUMENTS 9,827,583 B2 * 11/2017 Manzi ................. B05B 13/0278
10,513,856 B2 * 12/2019 Telleria .................... B05B 1/28
(Continued)

*Primary Examiner* — Ian Jen
(74) *Attorney, Agent, or Firm* — IDEA Intellectual Limited; Margaret A. Burke; Sam T. Yip

(57) ABSTRACT

The embodiments herein discloses a semi-autonomous mobile robotic apparatus (100) that can apply primers and paints and perform other operations such as wall sanding, drawing abstract wall art on the interior walls of buildings. The disclosed semi-autonomous mobile robotic apparatus (100) apparatus comprises of at least 13 numbers of type-1 (403) and at least 2 numbers of type-2 (405) ultrasonic sensors coupled to the apparatus (100), at least 2 Light Detection and Ranging (LiDAR) sensors (401 and 402) coupled to the apparatus (100), a human machine interface module (102) adapted to receive one or more inputs from a user (101) and provide the data to the microprocessor (103) for processing inside the apparatus (100) and provide output to one or more modules (104 and 105) to perform the relevant painting, sanding, putty application or abstract wall art drawing operations.

22 Claims, 25 Drawing Sheets

(51) Int. Cl.
  *B05B 13/00*  (2006.01)
  *B05B 13/04*  (2006.01)
  *B25J 11/00*  (2006.01)

(52) U.S. Cl.
  CPC ....... *B05B 13/0421* (2013.01); *B25J 11/0075* (2013.01); *G05D 1/0094* (2013.01); *G05D 1/024* (2013.01); *G05D 1/0255* (2013.01)

(58) Field of Classification Search
  CPC ... B25J 11/0075; G05D 1/0094; G05D 1/024; G05D 1/0255
  See application file for complete search history.

(56) References Cited

U.S. PATENT DOCUMENTS

| | | | |
|---|---|---|---|
| 11,499,325 B2* | 11/2022 | Telleria | B25J 9/1661 |
| 11,583,876 B2* | 2/2023 | Pringle, IV | B05B 7/12 |
| 11,654,561 B2* | 5/2023 | Askey | B25J 9/1684 |
| | | | 700/245 |
| 11,724,404 B2* | 8/2023 | Telleria | B25J 9/1697 |
| | | | 700/160 |
| 11,850,615 B2* | 12/2023 | Logan | B08B 1/34 |
| 11,946,268 B2* | 4/2024 | Logan | B08B 3/024 |
| 12,036,577 B2* | 7/2024 | Hegeman | B05B 13/005 |
| 12,042,903 B2* | 7/2024 | Scharpf | B24B 49/16 |
| 2016/0121486 A1* | 5/2016 | Lipinski | B05B 13/0431 |
| | | | 427/427.3 |
| 2018/0093289 A1* | 4/2018 | Raman | G05D 1/0234 |
| 2018/0318865 A1* | 11/2018 | Harvison | B05C 1/16 |
| 2018/0369846 A1* | 12/2018 | Mettu | B05B 12/00 |
| 2019/0118209 A1* | 4/2019 | Rennuit | B25J 13/06 |
| 2019/0151882 A1* | 5/2019 | Tritt | G05B 15/02 |

* cited by examiner

ROBOTIC ASSISTED WALL PAINTING APPARATUS AND METHOD

A) CROSS-REFERENCE TO RELATED APPLICATION

This application claims the priority from the Provisional Patent Application filed at the Indian Patent Office dated Jun. 19, 2020 bearing the Indian Patent Application Number 202041025896 and titled, "ROBOTIC ASSISTED WALL PAINTING SYSTEM AND METHOD", each of which is hereby incorporated by reference herein for all purposes.

B) TECHNICAL FIELD

The present invention relates to application of robotics and automation in the field of construction and paint application industries. More specifically, the present invention relates to use of Artificial Intelligence (AI), robotics and automation for robotic assisted wall paint apparatus and method, which assists in application of primers on the walls, multiple color sprays and dynamic pressure wall sanding.

C) BACKGROUND OF THE INVENTION

Ever since the advent of the robots in the industry there have been development of multiple types of robots for various purposes that comprises of areas such as manufacturing industries, construction sites, etc. Over the years, there has been consistent efforts that could lead to the development of a robot that is capable of performing the paint operation of the interior walls of the homes. This idea is the combination of mixing robotics in painting industry is widely known where the design is complex and the painting should be time efficient and easy to handle to achieve absolute results.

Paint and primer application robots should be fully automated from its inception into the construction site until the completion of the painting process. Any human intervention in this process does not qualify for a fully automated painting process. This automation process to qualify for a fully automated painting process must include starting with determining the roughness of the surface, which is to be painted, to reduce the wastage of the paint. The bot or the automation device must also measure the viscosity of the paint that it is supplied with to ensure the amount of paint that is being applied provides a uniform texture every time it is used for the application, thereby ensuring a consistent quality over period. The robot must also be capable of autonomously adjusting the distance from the wall during its movements to ensure that the paint applied is been uniformly done with the flawless design.

Most of the available robotic painting apparatus and method comprises of at least a limited manual intervention in achieving the complete painting process at the construction site. In addition, inconsistencies in measurement of the painting wall, robotic movement of the device at space limited places etc. all adds up to difficulties in achieving a painting process which is fully automated.

Hence, in view of the foregoing, there is a need to provide an effective apparatus and method for robotic and Artificial Intelligence assisted painting and primer application system.

The above-mentioned shortcomings, disadvantages and problems are addressed herein, which will be understood by reading the following specification.

D) OBJECTS OF THE INVENTION

The primary object of the present invention is to provide a semi-autonomous mobile robot apparatus that can apply primers and paints on the interior walls of the buildings at the construction site.

The other object of the present invention is to provide a semi-autonomous mobile robot apparatus that is capable of being operated through a wireless tablet/mobile device, which allows the semi-autonomous mobile robot apparatus move on the floor in any orientation and in any direction and with other such abilities.

Another object of the present invention is to provide a semi-autonomous mobile robot apparatus such that this semi-autonomous mobile robot apparatus is able to derive maximum speed and efficiency using an airless spray rig.

Another object of the present invention is to provide a semi-autonomous mobile robot apparatus that allows for remote monitoring and distances the applicator from harmful and toxic fumes on paint while applying the same on the wall.

These and other objects and advantages of the present invention will become readily apparent from the following detailed description taken in conjunction with the accompanying drawings.

E) SUMMARY OF THE INVENTION

The embodiments of the present invention provide a semi-autonomous mobile robot apparatus and method that can be pre-programmed and configured to apply primers and paints on the interior walls of buildings for construction. The disclosed semi-autonomous mobile robot apparatus or the mobile robotic apparatus can be easily operated through a wireless tablet/mobile device, wherein this enables the semi-autonomous mobile robot apparatus to move on the floor in any orientation and in any direction.

According to the embodiment, the semi-autonomous mobile robot apparatus comprises of at least 13 numbers of type-1 and at least 2 numbers of type-2 ultrasonic sensors coupled to the apparatus, at least 2 Light Detection and Ranging (LiDAR) sensors coupled to the apparatus, a human machine interface module adapted to receive one or more inputs from a user and provide the data to the microprocessor for processing inside the apparatus, a microprocessor adapted to process the received inputs and provide the processed data as an output to the other connecting modules of the apparatus, one or more vertical telescopic arm in combination with linear actuators coupled to the semi-autonomous mobile robot apparatus, a spray actuation unit coupled to one or more vertical telescopic arm on the apparatus, one or more different modular end effectors coupled to one or more vertical telescopic arm on the apparatus, at least 2 stepper motors fastened to the apparatus in differential mobile base to align with the wall by performing operations such as but not limited to left movement, right movement, clockwise movement and anticlockwise movement; one or more spray gun coupled to the one or more vertical telescopic arm on the apparatus, one or more wall sanding unit coupled to one or more vertical telescopic arm on the apparatus, a mobile navigation module adapted to receive inputs from the microprocessor regarding the navigation of the apparatus, a error diagnosis module adapted to receive inputs regarding the error encountered by the apparatus during the operation and display to the user, a safety module configured to comprise of one or more sensors and adapted to transmit information relating distance, to the microprocessor which the information indicates any obstacles encountered during the course of the navigation of the apparatus.

According to the embodiment, the microprocessor receives one or more inputs relating to the wall area of the paint to be applied, colour of the paint to be applied, texture of the paint to be applied, instructions relating to sanding operation of the wall, instructions relating to the non-paintable area in the wall and processes these data with other data such as position of the apparatus with respect to the wall, the distance between the modular end effectors such as spray guns or sanding unit of the apparatus to the wall, and provides instructions to the base navigation module which comprises of one or more stepper motors to automatically adjust the distance between the apparatus and the wall thereby enabling the semi-autonomous mobile robot apparatus to perform the programmed operations such as, but not limited to painting, wall sanding, primer application, putty application and pressured water spray.

In one embodiment, the disclosed invention describes a semi-autonomous mobile robot apparatus that is configured to derive maximum speed and efficiency using an airless spray rig. This proposed solution also allows for remote monitoring and distances the applicator from harmful and toxic fumes on paint while applying the same on the wall. Concepts such as Artificial Intelligence, Computer vision, machine learning and control systems are integrated into the manufacture of a novel firmware (method) which are integrated into this semi-autonomous mobile robot apparatus which using the method and the novel system can apply primers and paints on the interior walls. The disclosed semi-autonomous mobile robot apparatus saves numerous man-hours and accelerates the pace of finishing in a construction project thereby reducing the handover time of the property in the field of real-estate business. This solves one of the biggest problems of delays in the construction industry. The proposed semi-autonomous mobile robot apparatus and method also addresses the shortage of skilled workforce in the market for decorative painting.

In one embodiment, the disclosed semi-autonomous mobile robot apparatus comprises a novel vertical telescopic design mechanism which is designed using a combination of linear and rotary actuators to enable very high painting speeds of up to 85 sft./min. The newly designed software (method) modules enable a person to draw a 2D as well as 3D representation of top-view of floor-map of the area on the computer tablet display that needs to be painted.

Additionally, the drawing of these walls can be further detailed with position and dimension of elements like doors, windows, switchboards and other non-paintable elements. This creates the spatial information for the robot to follow a given path and execute painting on the walls automatically. Overall, a combination of hardware and software systems disclosed herein implement the most ideal manner of spray painting a surface to deliver the best finish.

In one embodiment, the disclosed wall painting semi-autonomous mobile robot apparatus comprises of 6 modules which carry a specific function to perform the wall painting activity:
1. Microprocessor
2. Human Machine Interface
3. Mobile Navigation Module
4. Vertical spray actuation Module
5. Safety Module
6. Error Diagnosis In one embodiment, one or more distance measuring sensors provide input to the microprocessor which in turn controls the stepper motor movement for precise and accurate navigation of the mobile painting robot.

In another embodiment, the spray gun coupled to the one or more vertical telescopic arm on the apparatus can be programmed to carry out functions such as but not limited to draw various, graphical designs, line arts, abstracts, portraits and Landscapes.

In another embodiment, one or more wall-sanding units coupled to one or more vertical telescopic arms on the apparatus comprises but not limited to pressure sensors, displacement sensors.

In another embodiment, method for performing painting and sanding operations on a wall using a semi-autonomous mobile robot apparatus, the method comprising: receiving one or more inputs through a human machine interface relating to the wall area of the paint to be applied, colour of the paint to be applied, texture of the paint to be applied, instructions relating to sanding operation of the wall, instructions relating to the paintable and non-paintable area in the wall; process the received inputs through a microprocessor; provide processed control instructions from the microprocessor to vertical spray actuation unit, mobile navigation module, error diagnosis module and safety module finally complete the programmed task and report in case of error is encountered to the microprocessor.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

F) BRIEF DESCRIPTION OF THE DRAWINGS

The other objects, features and advantages will occur to those skilled in the art from the following description of the preferred embodiment and the accompanying drawings in which.

Figure 16:
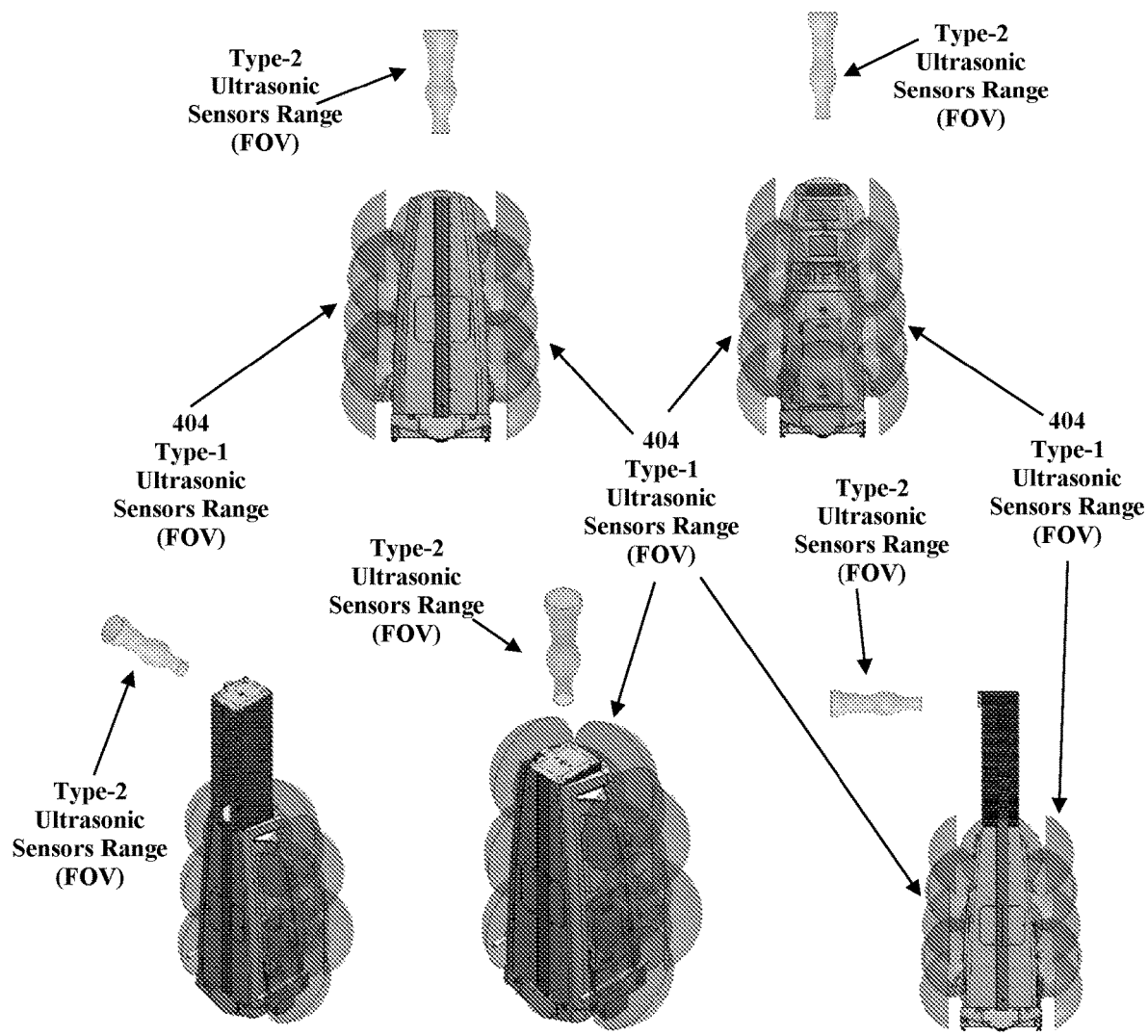

FIG. 16 illustrates the front view, rear view and Isometric View with FOV of the first and second type of Ultrasonic sensors' Field-Of-View when telescopic mechanism is at its bottommost position and Front View with the isometric view with FOV of the first and second type of Ultrasonic sensors' Field-Of-View when telescopic mechanism is at its topmost and bottommost position according to an embodiment of the present invention.

Figure 17:
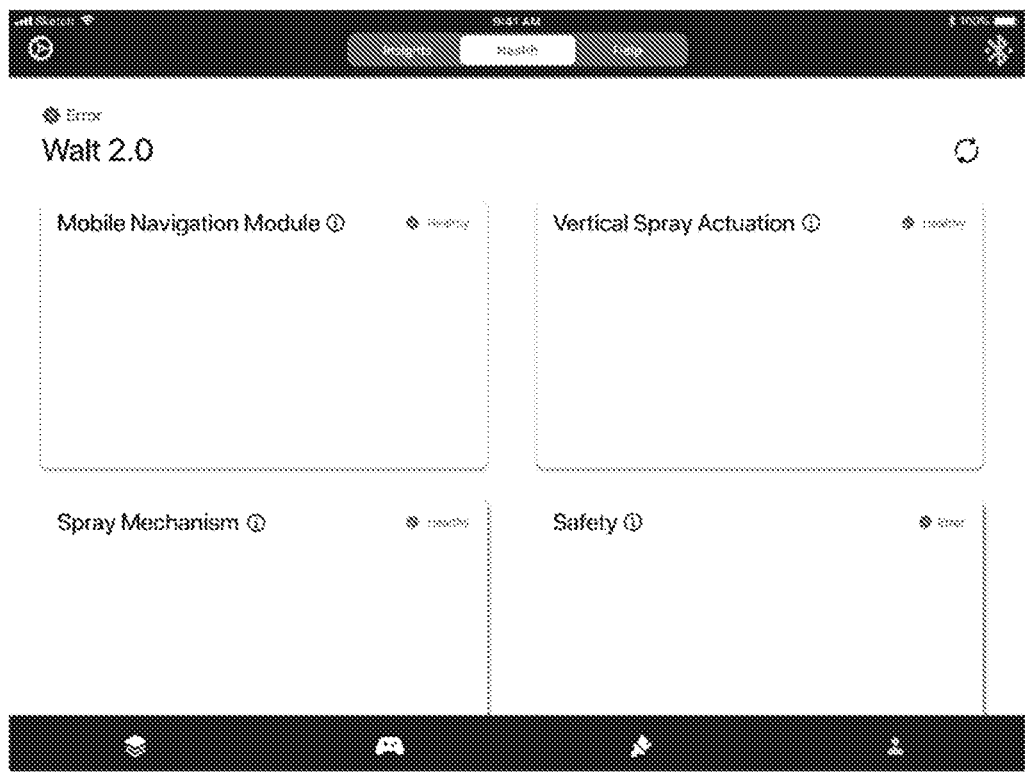

FIG. 17 illustrates a user interface display of Error Diagnosis Status on the Human Machine Interface according to an embodiment of the present invention.

Figure 18:
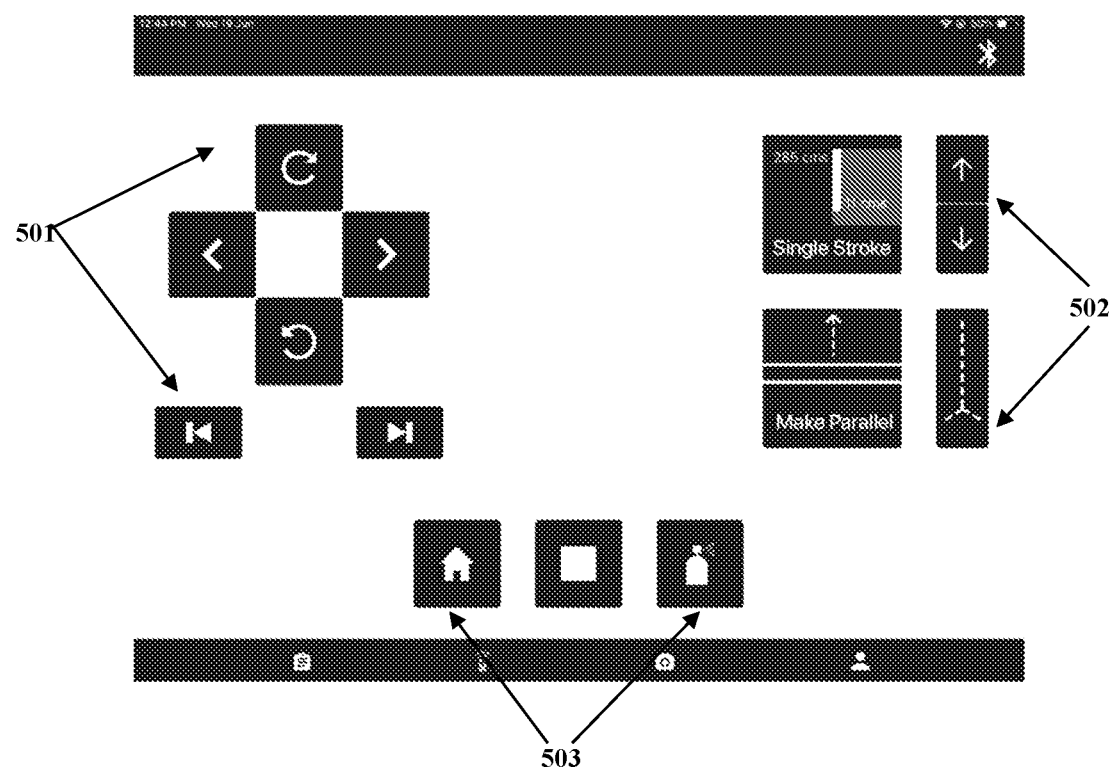

FIG. 18 illustrates the Control Console on the Human Machine Interface of the semi-autonomous mobile robot apparatus according to an embodiment of the present invention.

Figure 19:
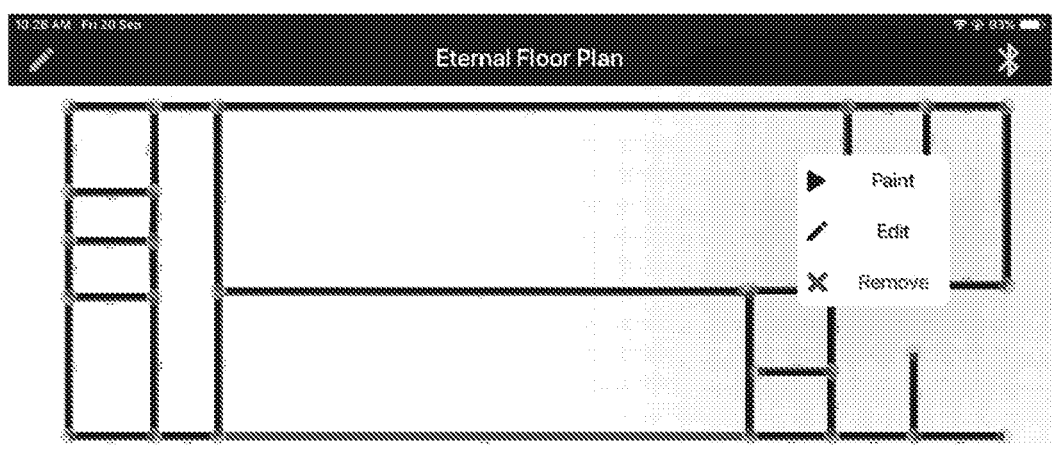

FIG. 19 illustrates the user interface display where the co-ordinates of the section to be painted are entered according to an embodiment of the present invention.

Figure 20:
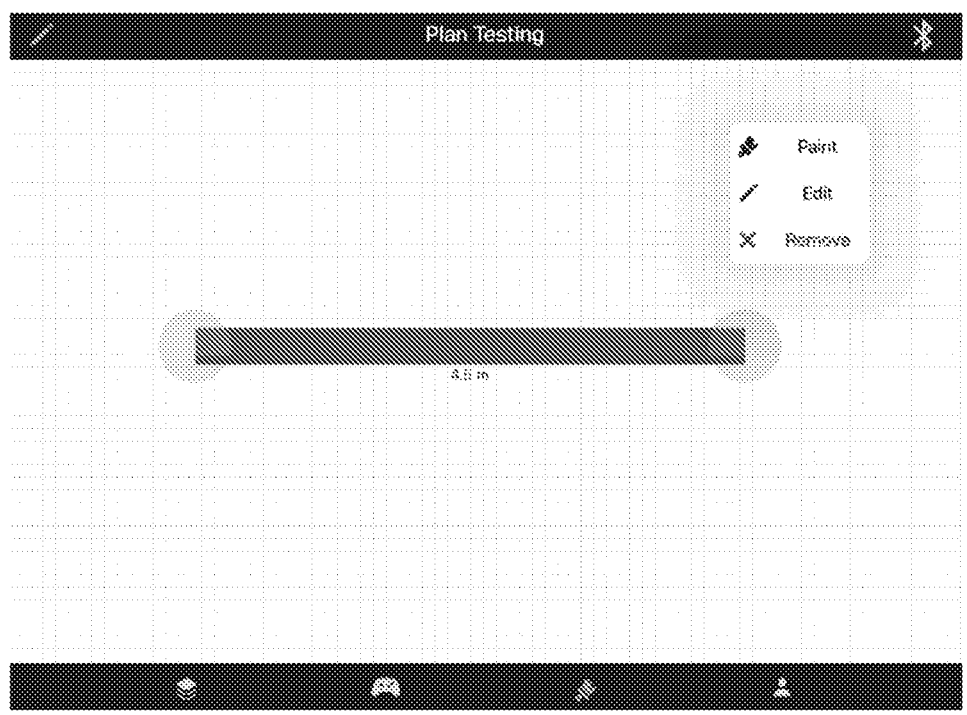

FIG. 20 illustrates user interface display wherein the co-ordinates of the section which also knows as the floor plan, to be painted with paintable and non-paintable regions are selected according to an embodiment of the present invention.

Figure 21:
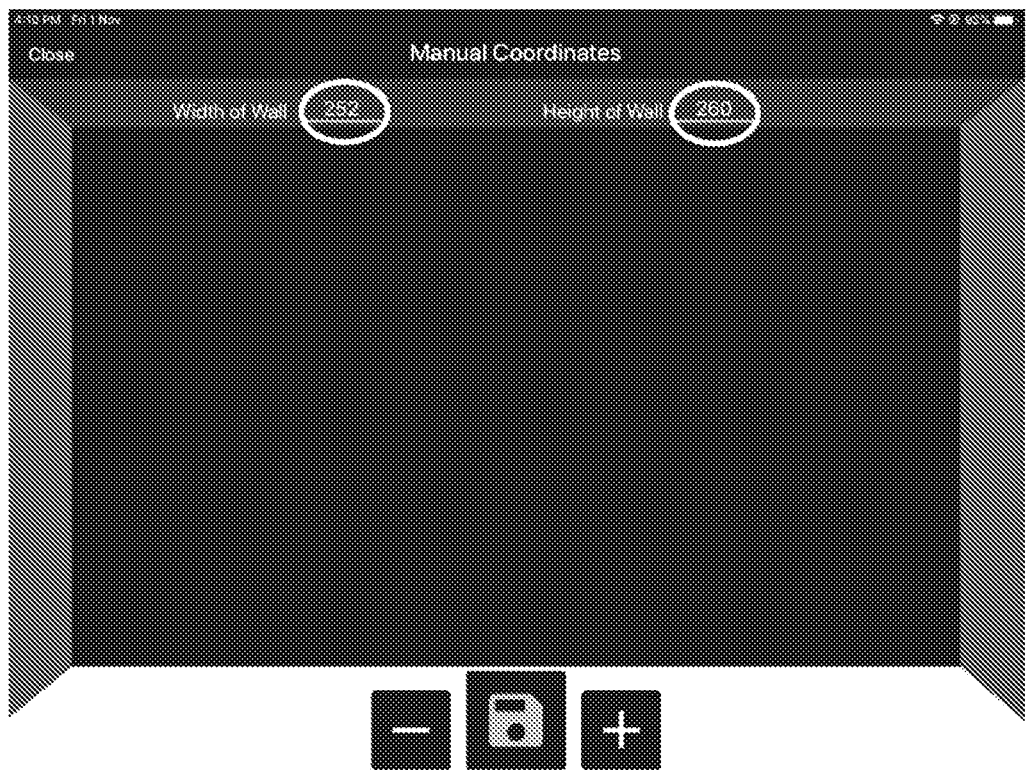

FIG. 21 illustrates a user interface display wherein the co-ordinates are entered manually for selection of the paintable region according to an embodiment of the present invention.

Figure 22:
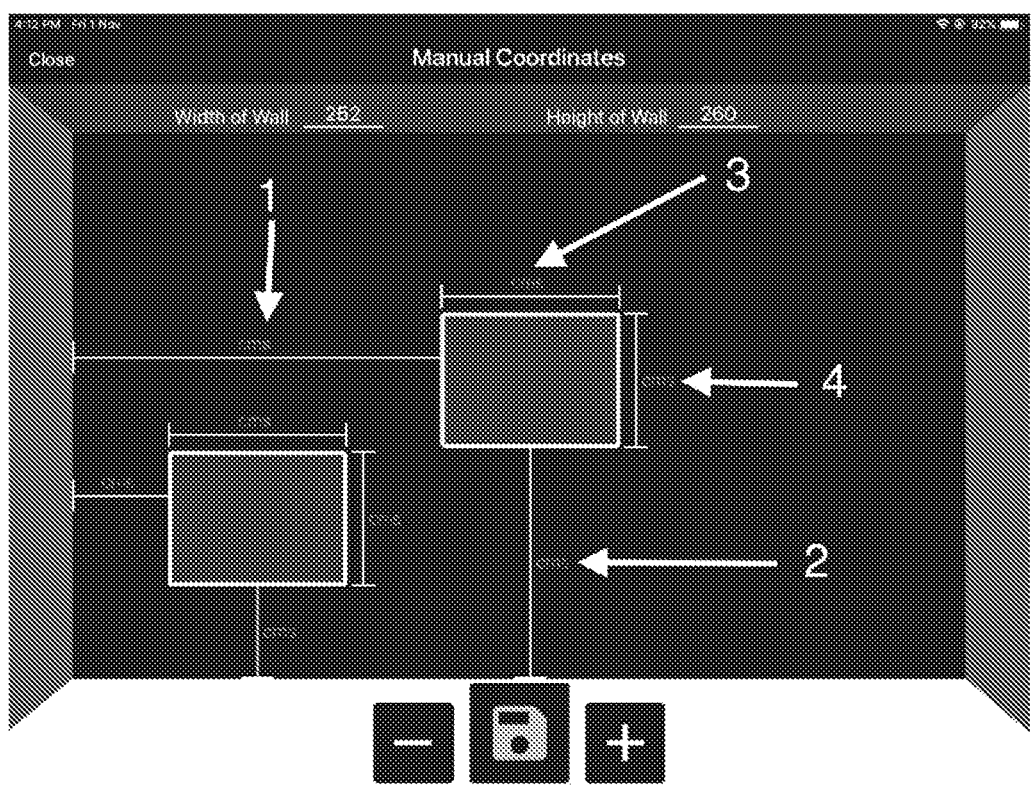

FIG. 22 illustrates a user interface display wherein on entering the co-ordinates the dashboard is displayed illustrates the total paintable and non-paintable region according to an embodiment of the present.

Figure 23:
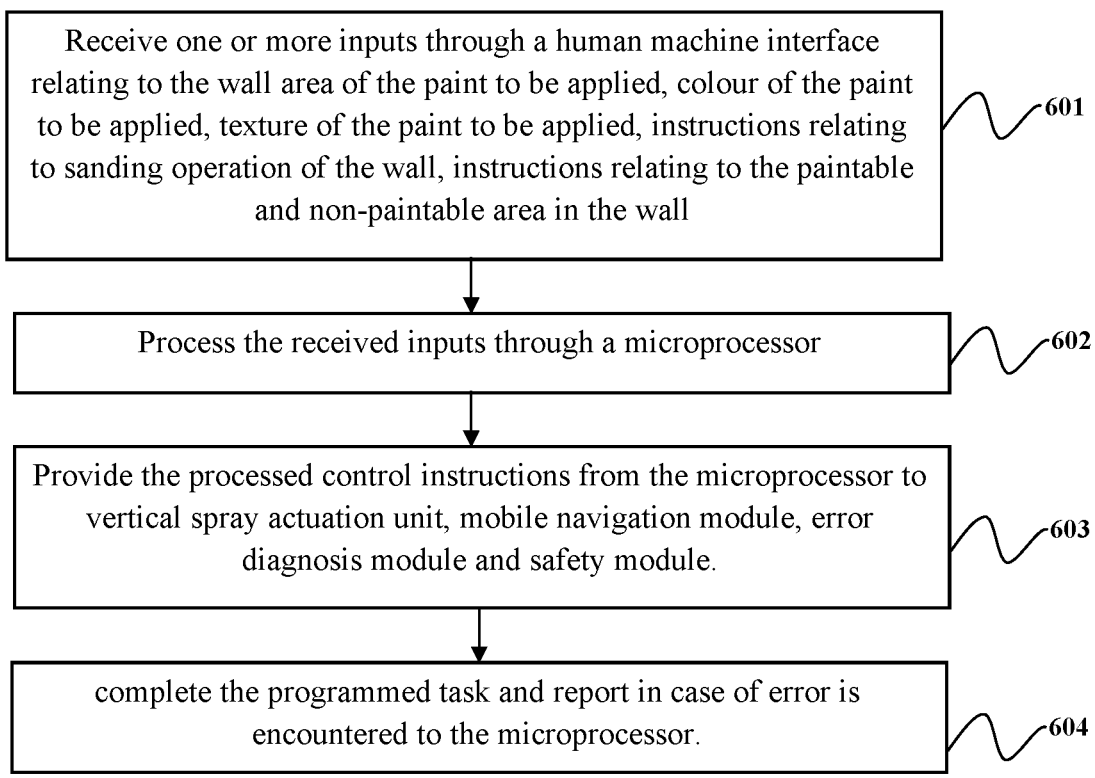

FIG. 23 illustrates a method for performing painting and sanding operations on a wall using a semi-autonomous mobile robot apparatus according to an embodiment of the present.

Figure 24:
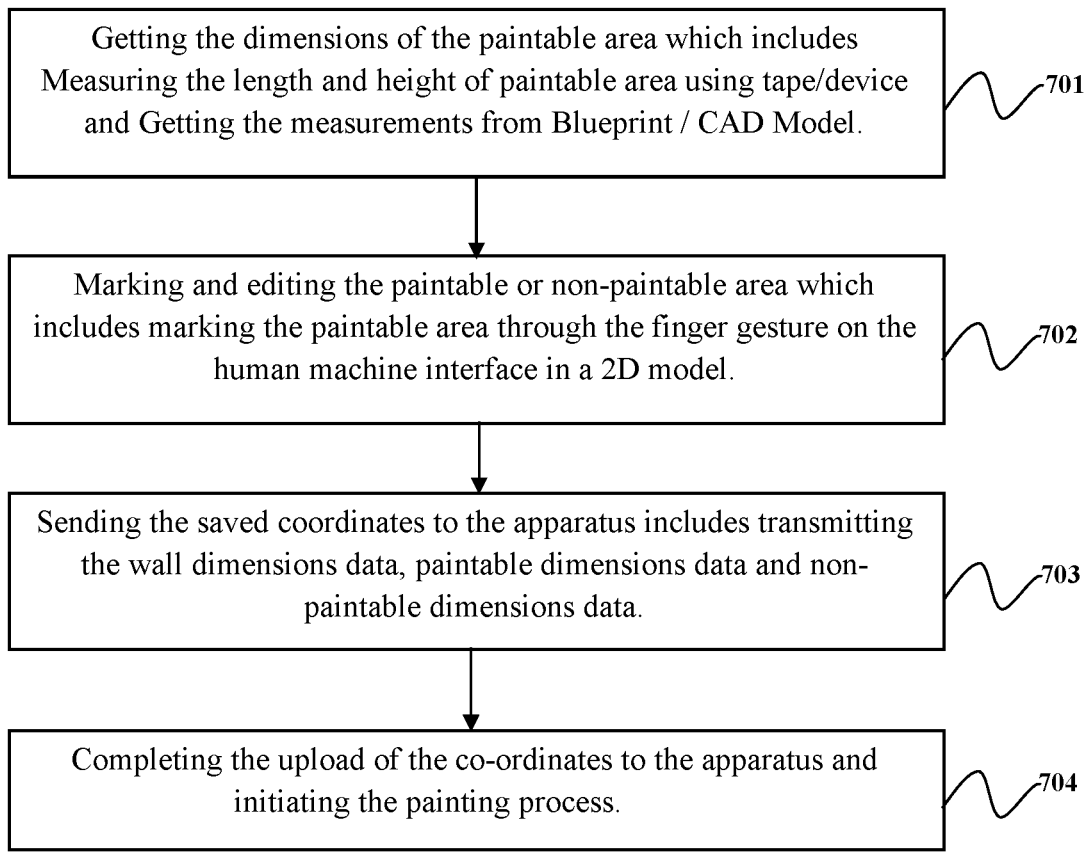

FIG. 24 illustrates a method which provides inputs to the actuating the vertical spray unit through the inputs provided by the microprocessor according to an embodiment of the present.

Figure 25:
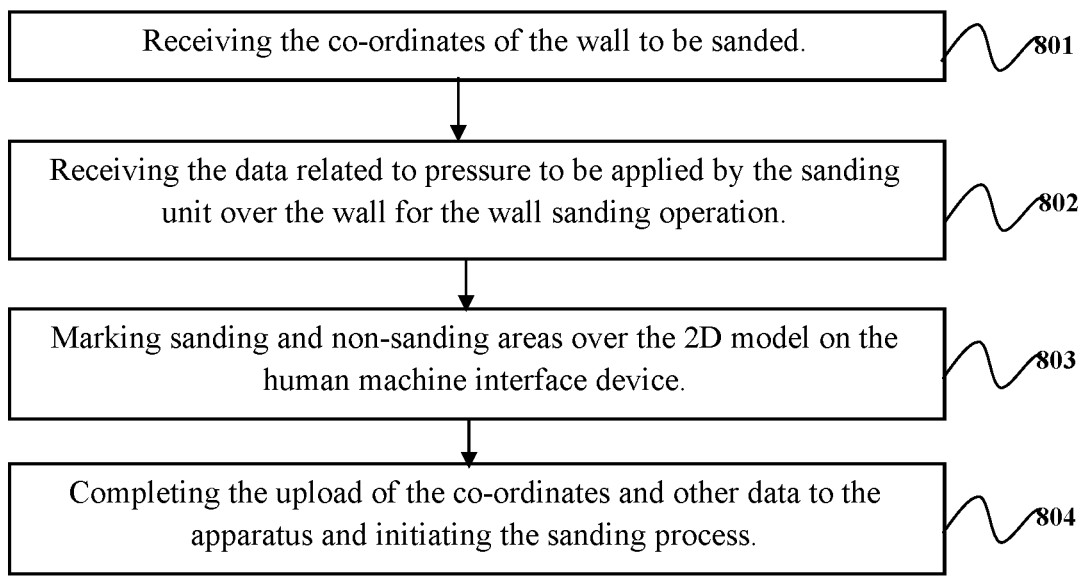

FIG. 25 illustrates a method of wall sanding operation according to an embodiment of the present.

Although specific features of the present invention are shown in some drawings and not in others. This is done for convenience only as each feature may be combined with any or all of the other features in accordance with the present invention.

G) DETAILED DESCRIPTION OF THE INVENTION

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Disclosed herein is a semi-autonomous mobile robotic apparatus that can apply primers and paints on the interior walls of buildings for construction. The disclosed robotic apparatus or the mobile robotic apparatus can be easily operated through a wireless tablet/mobile device, move on the floor in any orientation and in any direction.

Accordingly, the disclosed invention describing an apparatus design has been done in a novel manner to derive maximum speed and efficiency using an airless spray rig. This proposed solution also allows for remote operation and distances the applicator from harmful and toxic fumes on paint while applying the same on the wall. Methods such as Artificial Intelligence, Computer vision, machine learning and control systems are integrated into the manufacture of this novel firmware which are integrated into this semi-autonomous mobile robot apparatus that can apply primers and paints on the interior walls. The semi-autonomous mobile robot apparatus saves numerous man-hours and accelerates the pace of finishing in a construction project thereby reducing the handover time of the property in the field of real-estate business. This solves one of the biggest problems of delays in the construction industry. The proposed apparatus and method also addresses the shortage of skilled workforce in the market for decorative painting.

The semi-autonomous mobile robot apparatus comprises a novel vertical telescopic design mechanism which is designed using a combination of horizontal linear sliders with servo modules to enable very high painting speeds of up to 85 sft./min. The newly designed software modules enable a person to draw a 2D as well as 3D representation of top-view of floor-map of the area that needs to be painted.

Additionally, the drawing of these walls can be further detailed with position and dimension of elements like doors, windows, switchboards and other non-paintable elements. This creates the spatial information for the robot to follow a given path and execute painting on the walls automatically. Overall, a combination of hardware and software systems disclosed herein implement the most ideal manner of spray painting a surface to deliver the best finish.

Figure 1:
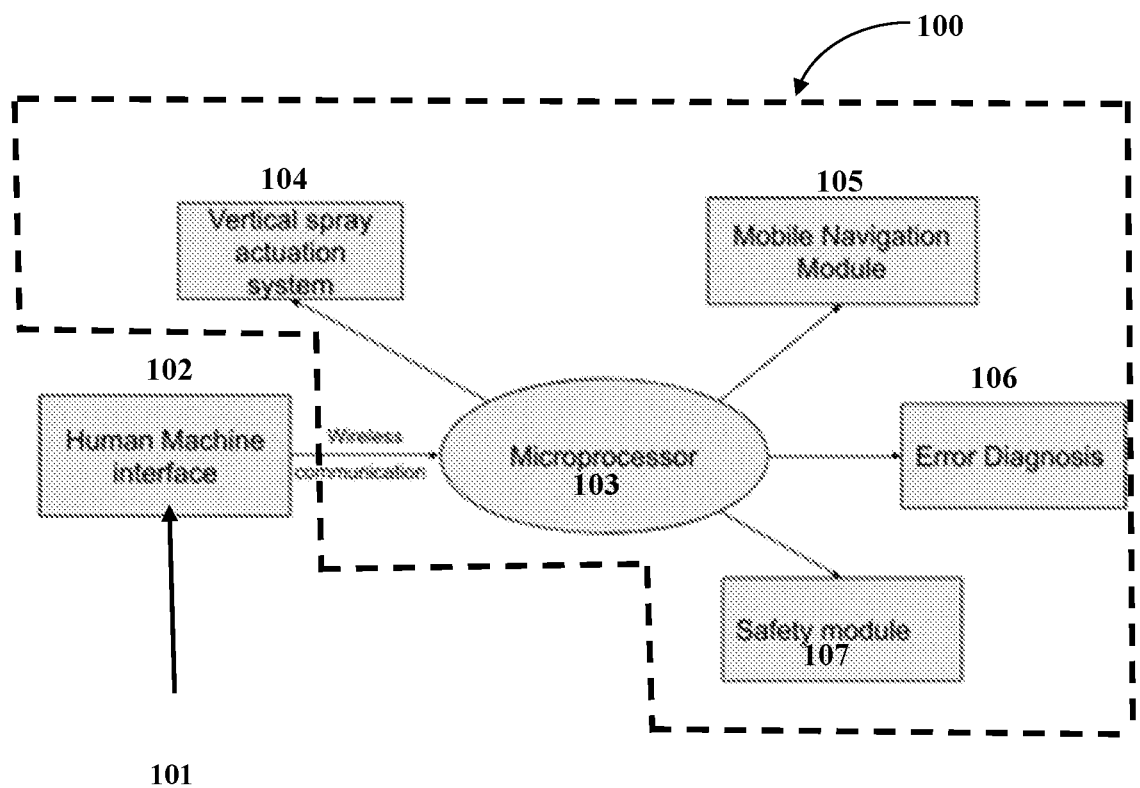
FIG. 1 illustrates a block level diagram illustrating various modules of the semi-autonomous mobile robot apparatus according to an embodiment of the present invention.

FIG. 1 illustrates a block level diagram illustrating various modules of the semi-autonomous mobile robot apparatus according to an embodiment of the present invention.

According to the embodiment, semi-autonomous mobile robot apparatus (100) comprises of at least 13 numbers of type-1 ultrasonic (403) and at least 2 numbers of type-2 ultrasonic (405) sensors integrated into the mobile navigation module (105) and coupled to the apparatus (100), at least 2 Light Detection and Ranging (LiDAR) sensors (401 and 402) is coupled to the apparatus (100), a human machine interface module (102) is adapted to receive one or more inputs from a user (101) and provide the data to the microprocessor (103) for processing inside the apparatus (100).

The microprocessor (103) herein is adapted to process the received inputs and provide the processed data as an output to the other connecting modules of the apparatus (100), one or more vertical telescopic arm in combination with linear actuators coupled to the semi-autonomous mobile robot apparatus (100), a vertical spray actuation unit (104) coupled to one or more vertical telescopic arm on the apparatus (100), one or more different modular end effectors coupled to one or more vertical telescopic arm on the apparatus (100), at least 2 stepper motors (203a and 203b) fastened to the apparatus in differential mobile base to align with the wall by performing operations such as but not limited to left movement, right movement, clockwise movement and anti-clockwise movement, one or more spray gun (307) coupled to the one or more vertical telescopic arm on the apparatus (100), one or more wall sanding unit coupled to one or more vertical telescopic arm on the apparatus (100), a mobile navigation module (105) adapted to receive inputs from the microprocessor (103) regarding the navigation of the apparatus (100), an error diagnosis module (106) adapted to receive inputs regarding the error encountered by the apparatus (100) during the operation and display to the user (101), a safety module (107) adapted to transmit the output signals to the microprocessor (103) to pause the operation/functioning of the apparatus (100) in case of any obstacles encountered/detected within a defined range by the user.

The microprocessor (103) receives one or more inputs relating to the wall area of the paint to be applied, color of the paint to be applied, texture of the paint to be applied, instructions relating to sanding operation of the wall, instructions relating to the non-paintable area in the wall and processes these data with other data such as position of the apparatus (100) with respect to the wall, the distance between the modular end effectors such as spray guns (307) or sanding unit of the apparatus (100) to the wall, and provides instructions to the two navigation stepper motors (203a and 203b) which is part of the mobile navigation module (105) to automatically adjust the distance between the apparatus (100) and the wall thereby enabling the semi-autonomous mobile robot apparatus (100) to perform the programmed operations such as but not limited to painting, wall sanding, primer application, putty application and pressured water spray.

The microprocessor (103) herein is programmed with the logic/intelligence of painting, sanding and other such robotic programmed actions and behavior to deal with different situations on a construction site. It interacts with the other sub-systems (104-107) and schedules the sequence of actions to be performed and the logic is explained in subsequent modules.

The User (101) interacts with the semi-autonomous mobile robot apparatus (100) via an iPad application on a Human Machine Interface (102) which is named "Jessie" developed by Eternal Robotics specifically for this purpose. Jessie has a control console to navigate the robot and an interface to input the paintable wall measurements with options to input 3D and 2D models to perform Auto-paint, sanding, pattern or art drawing (3D and 2D arts too) on the walls.

The semi-autonomous mobile robot apparatus (100) also comprises a differential drive mobile base (105) which comprises at least 2 stepper motors (203a and 203b) to navigate the robot on the floor. In addition to the motors there are 4 distance measuring sensors (201) which help the robot to align with a wall while painting, sanding, wall art drawing etc.

The Vertical Spray actuation Module (104) has components such as Stage-1 Actuator(Linear) (304a), Stage-1 Gearbox (303a), Servo motor—1 (302a), Servo Drive—1 (301a), Stage-2 Actuator(Linear) (304b), Stage-2 Gearbox (303b), Servo motor—2 (302b), Servo Drive—2 (301b), Rotary stepper motor (306), Spray gun (307) and Solenoid (308) (which triggers the spray gun). The Vertical Spray actuation module (104) is a 2 stage telescopic mechanism which carries a spray vertically to paint walls while the Mobile Navigation Module (105) moves it left and right to position the vertical spray actuation module (104) in an appropriate position in front of the wall.

The semi-autonomous mobile robot apparatus (100) has a suite of sensors to sense any obstacles in its vicinity and take an appropriate action. It has at least 2 LiDARs (401 and 402) with at least type-1 ultrasonic sensors of 13 numbers (403) and type-2 ultrasonic sensors of type-2 of 2 numbers (405) provide a complete sphere of protection around itself. The 15 Ultrasonic sensors (403 and 405) are aligned in specific locations on the apparatus so that there are no blind spots all along the length, width and height of the robot or apparatus. All these sensors data are accumulated in the safety module (107) of the semi-autonomous mobile robot apparatus (100).

The Error diagnosis module (106) comprises of a software or a method that updates the user about the status of the semi-autonomous mobile robot apparatus (100), making downtime of the semi-autonomous mobile robot apparatus (100) lesser and troubleshooting more localized and easier. All the motors and some of the sensors on the semi-autonomous mobile robot apparatus (100) have a mechanism to report errors like over current, under voltage etc. to diagnose the issue. These errors are read from the respective motor drivers and the sensor status to make the user aware of the nature of error with a particular electronic component on the semi-autonomous mobile robot apparatus (100).

Figure 2:
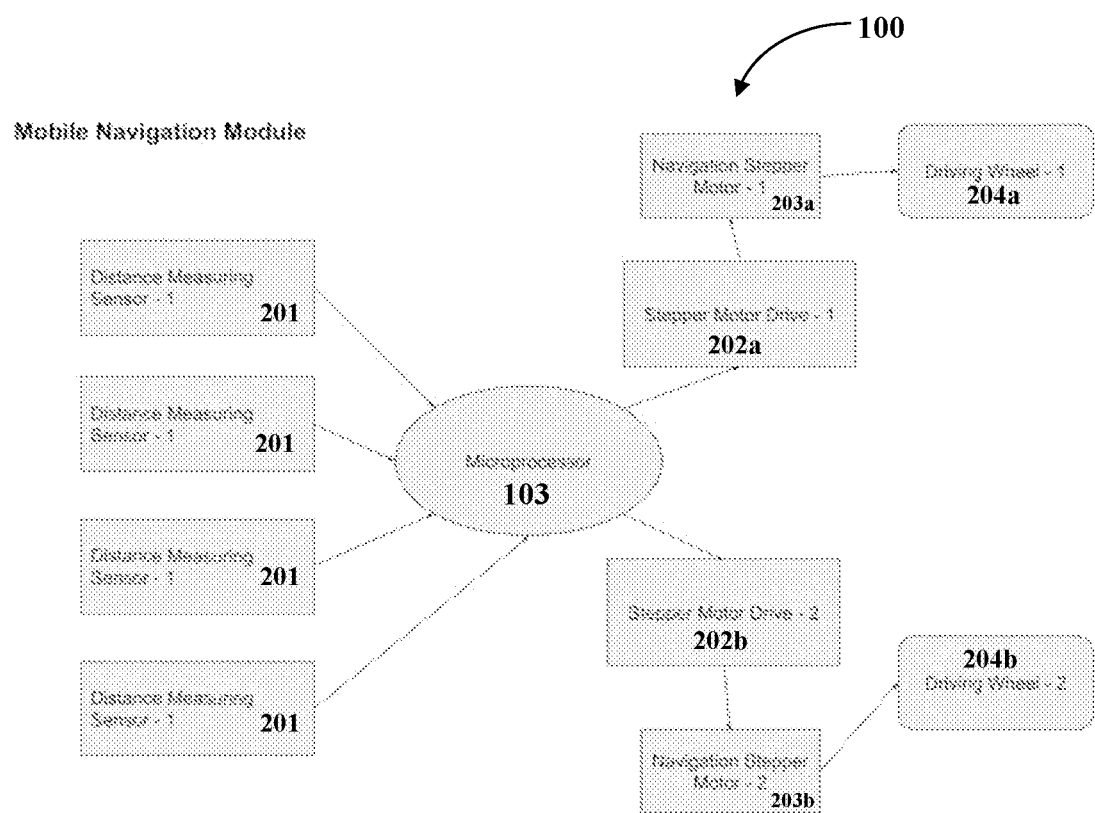
FIG. 2 illustrates a block level diagram of the mobile navigation module of the semi-autonomous mobile robot apparatus according to an embodiment of the present invention.

FIG. 2 illustrates a block level diagram of the mobile navigation module of the semi-autonomous mobile robot apparatus according to an embodiment of the present invention. According to the embodiment, one or more distance measuring sensors (201) provide input to the microprocessor (103) which in turn controls the stepper motor movement for precise and accurate navigation of the semi-autonomous mobile robot apparatus (100).

The microprocessor (103) receives inputs from one or more distance measuring sensors (201) and provide processed data output to the stepper motor drivers (202a and 202b) for providing inputs to the navigational stepper (203a and 203b) motors which in turn actuates the driving wheel (204a and 204b) for adjusting the distance between the apparatus (100) and the target wall. The microprocessor (103) receives inputs from one or more distance measuring sensors (201) and aligns the apparatus (100) parallel (only) to the wall by giving the navigation stepper motor 1 (203a) and navigation stepper motor 2 (203b) appropriate command whether to rotate clockwise or anti-clockwise.

The apparatus (100) is positioned facing parallel to the wall, the microprocessor (103) checks for its deviation from the ideal distance 'D' and if the deviation is more than an adjustable threshold (~2 cm), the navigation stepper motors (203a and 203b) rotate the apparatus clockwise by 90 degrees to align itself to move towards or away from the wall depending on the deviation. The apparatus (100) on rotation of 90 degrees from the current position, the distance measuring sensors 3 and 4 (201) will be positioned to the wall, the microprocessor (103) then sends signals to the navigation stepper motors (203a and 203b) to align the apparatus (100) parallel to the wall and then drives the semi-autonomous mobile robot apparatus (100) towards or away from the wall until distance "D" is reached.

Further, the microprocessor (103) provides input to the apparatus (100) for actuating the rotation of 90 degree anti-clockwise thereby the spray gun (307) is aligned with the wall at the ideal distance "D" and ready to start the painting function. The distance measuring sensors (201) provide appropriate signals to the microprocessor (103) regarding the feedback of the distance from the wall to the semi-autonomous mobile robot apparatus (100) and subsequently the microprocessor (103) sends signals to the 2 stepper motors in the differential mobile base to align with the wall by performing any of the 4 operations i.e rotate clockwise/anti-clockwise, move left or right.

Figure 3:
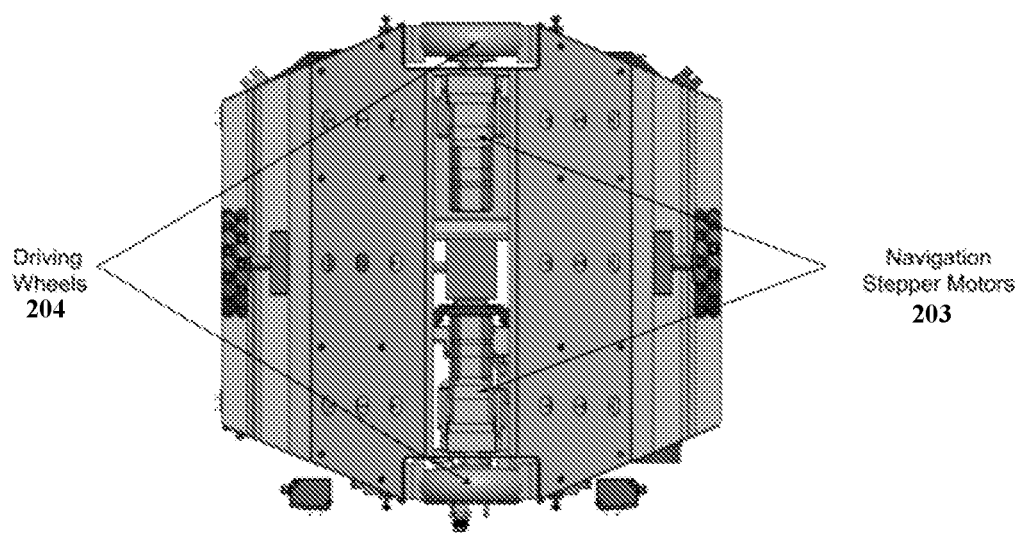
FIG. 3 illustrates the bottom view of the semi-autonomous mobile robot apparatus according to an embodiment of the present invention.
Figure 4:
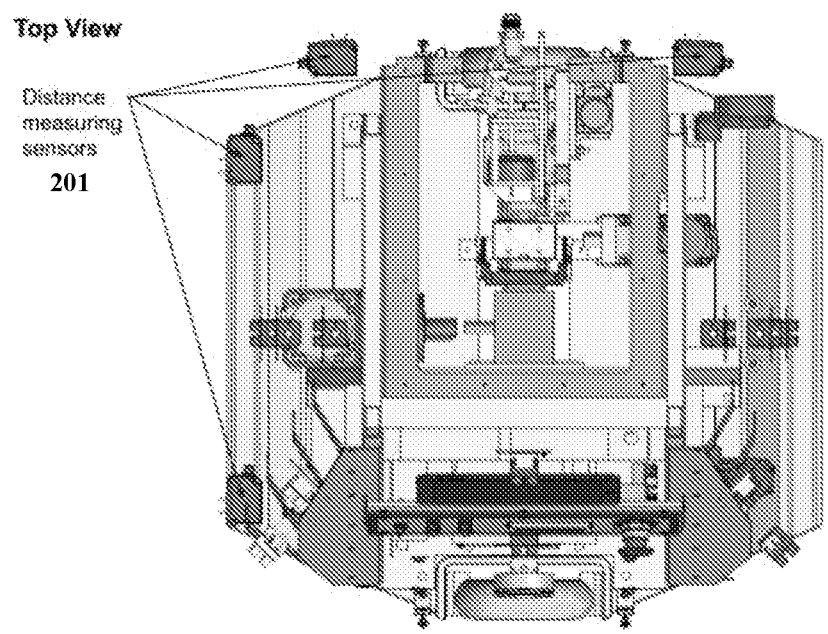
FIG. 4 illustrates a top view of the semi-autonomous mobile robot apparatus according to an embodiment of the present invention.

FIG. 3 illustrates the bottom view of the semi-autonomous mobile robot apparatus according to an embodiment of the present invention. FIG. 4 illustrates a top view of the semi-autonomous mobile robot apparatus according to an embodiment of the present invention. According to FIG. 3 and FIG. 4, the semi-autonomous mobile robot apparatus (100) comprises of a differential drive mobile base which has 2 stepper motors (203) to navigate the robot on the floor. In addition to the motors (203) there are 4 distance measuring sensors (201) which help the robot to align with a wall while painting or any other operation such as sanding, wall art drawing operation is conducted. An ideal coat of paint can be applied on the wall when the tip of the spray gun is maintained at a constant distance of 30 cm from the wall. These distance measuring sensors (201) provides the microprocessor (103) the feedback of the distance from the wall in front of the semi-autonomous mobile robot apparatus (100) and subsequently the microprocessor (103) sends signals to the 2 stepper motors (203) in the differential mobile base to align with the wall by performing any of the 4 operations i.e rotate clockwise/anti-clockwise, move left or right.

Figure 5:
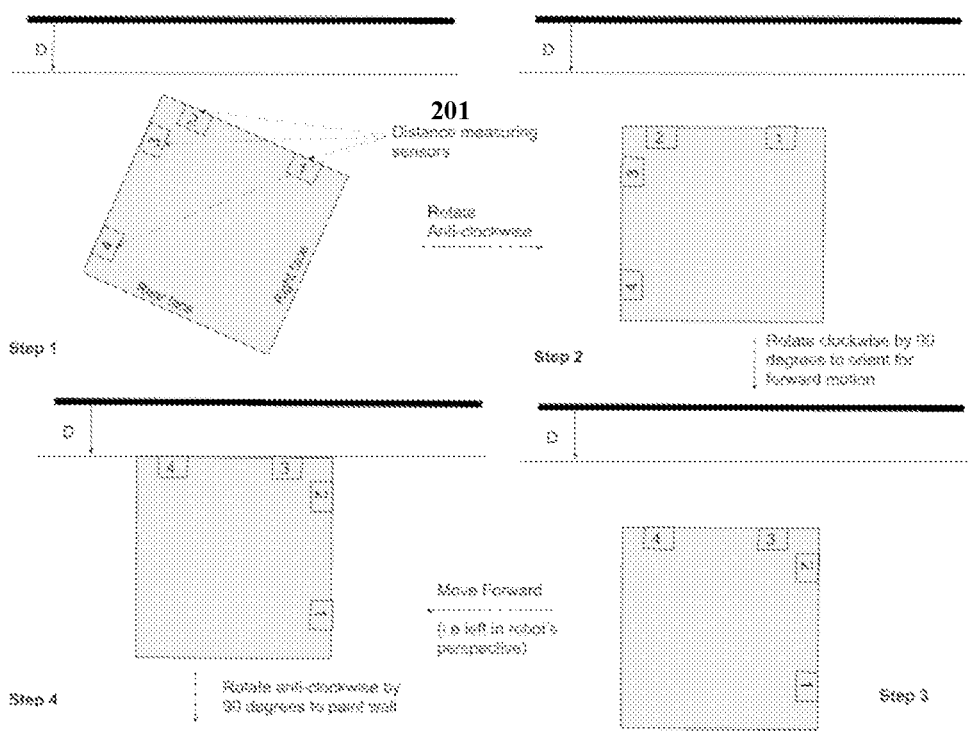
FIG. 5 and FIG. 6 illustrates the sequence of steps involved in a continuous process of aligning the semi-autonomous mobile robot apparatus with reference to the wall according to an embodiment of the present invention.
Figure 6:
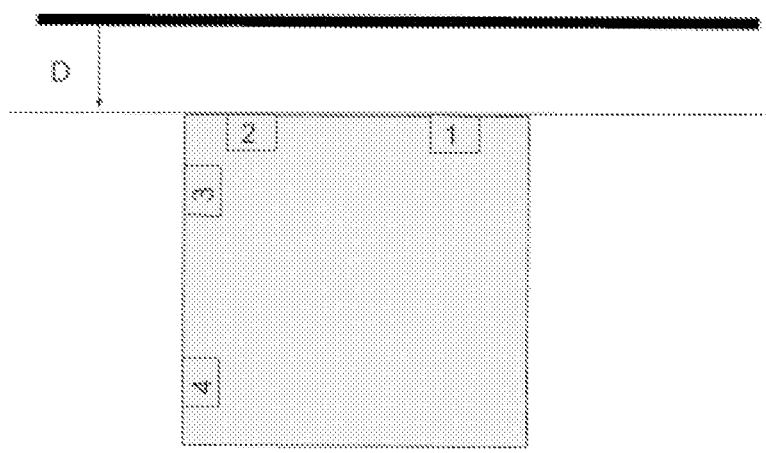

FIG. 5 illustrates semi-autonomous mobile robot apparatus orientation towards the wall according to an embodiment of the present invention. FIG. 6 illustrates semi-autonomous mobile robot apparatus orientation towards the wall according to an embodiment of the present invention. Accordingly, following are the steps that are pre-programed for successful navigation and maneuvering of the semi-autonomous mobile robot apparatus (100). These steps include:

Step 1: The semi-autonomous mobile robot apparatus (100) is in a random orientation and distance from the wall. User hits or provides "Make parallel" command.

Step 2: The microprocessor (103) reads the distance measuring sensor (1 and 2) (201) values and aligns the semi-autonomous mobile robot apparatus (100) parallel to the wall by giving the navigation stepper motors 1 and 2 (203) appropriate command whether to rotate clockwise or anti-clockwise.

Step 3: Once the semi-autonomous mobile robot apparatus (100) face is parallel to the wall, microprocessor (103) checks for it's deviation from the ideal distance 'D'. If the deviation is more than an adjustable threshold (~2 cm), the navigation stepper motors (203) rotate the semi-autonomous mobile robot apparatus (100) clockwise by 90 degrees to align itself to move towards or away from the wall depending on the deviation.

Step 4: Once the semi-autonomous mobile robot apparatus (100) rotates by 90 degrees and the distance measuring sensors 3 and 4 (201) face the wall, the microprocessor (103) sends signals to the navigation stepper motors (203) to align the semi-autonomous mobile robot apparatus (100) parallel to the wall and then drives the semi-autonomous mobile robot apparatus (100) towards or away from the wall until distance "D" is reached.

Step 5: Since the spray gun (307) is on the front face of the semi-autonomous mobile robot apparatus (100), it needs to be aligned back so that the front face is pointing towards the wall. Therefore, now the semi-autonomous mobile robot apparatus (100) rotates anti-clockwise by 90 degrees so that the spray gun (307) is aligned with the wall at the ideal distance "D" and ready to paint.

Figure 7:
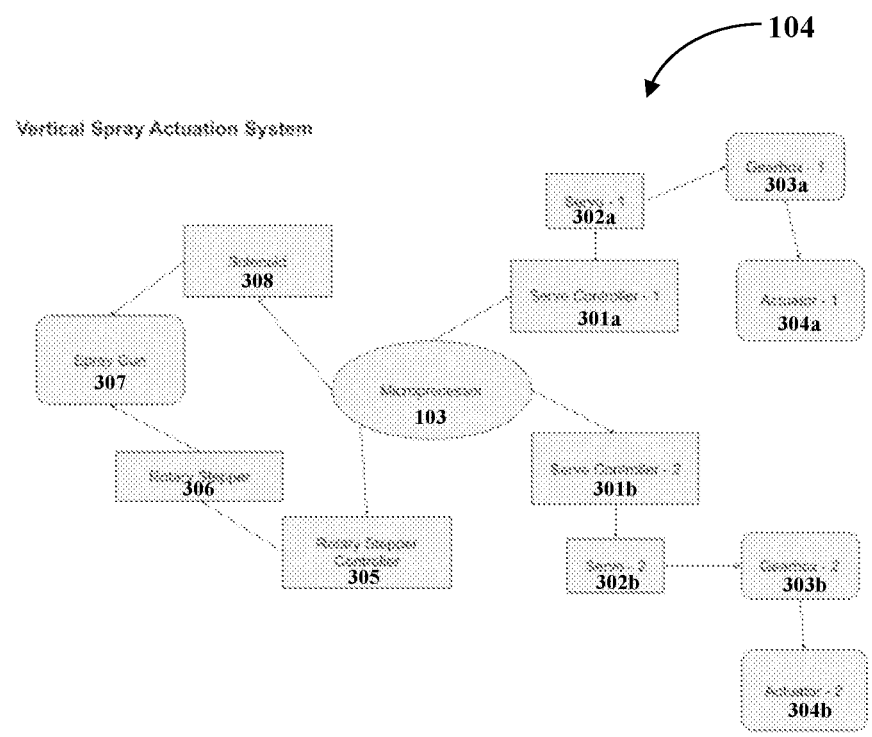
FIG. 7 illustrates a vertical spray actuation system of the semi-autonomous mobile robot apparatus according to an embodiment of the present invention.

FIG. 7 illustrates a vertical spray actuation system of the semi-autonomous mobile robot apparatus according to an embodiment of the present invention. According to the embodiment, the vertical spray actuation module (104) is a 2 stage telescopic mechanism which carries a spray vertically to paint walls while the Mobile Navigation Module (105) moves it left and right to position the vertical spray actuation module (104) in an appropriate position in front of the wall.

Figure 8:
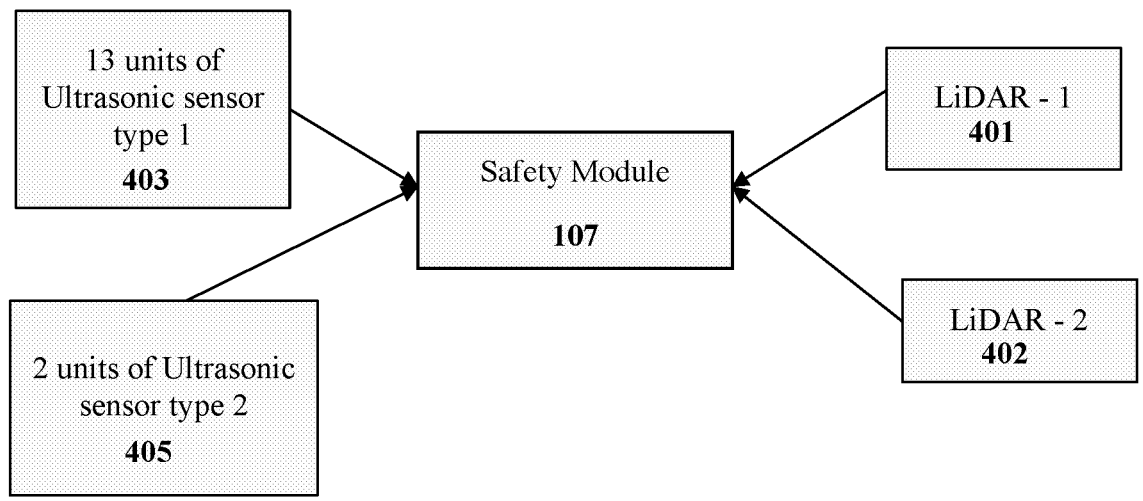
FIG. 8 illustrates the sensors and the safety module integration for obstacle avoidance and guided movement of the semi-autonomous mobile robot apparatus with the vertical spray actuation system according to an embodiment of the present invention.

FIG. 8 illustrates the sensors and the safety module integration for obstacle avoidance and guided movement of the semi-autonomous mobile robot apparatus with the vertical spray actuation system according to an embodiment of the present invention. Accordingly, the semi-autonomous mobile robot apparatus (100) has at least 2 LiDARs (401 and 402) with at least type-1 ultrasonic sensors of 13 numbers (403) and type-2 ultrasonic sensors of type-2 of 2 numbers (405) are provided a complete sphere of protection around itself. These sensors are integrated at various angles over the semi-autonomous mobile robot apparatus (100) providing the obstacle scanning to the semi-autonomous mobile robot apparatus (100) 360 degrees. The 15 Ultrasonic sensors (403 and 405) are aligned in specific locations on the apparatus so that there are no blind spots all along the length, width and height of the robot or apparatus. All these sensors data are accumulated in the safety module (107) of the semi-autonomous mobile robot apparatus (100).

Figure 9:
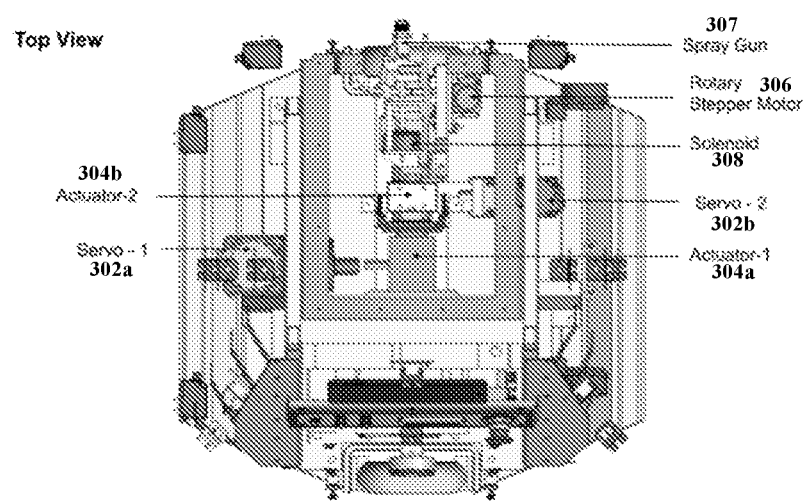
FIG. 9 illustrates the top view of the semi-autonomous mobile robot apparatus with the vertical spray actuation system according to an embodiment of the present invention.
Figure 10:
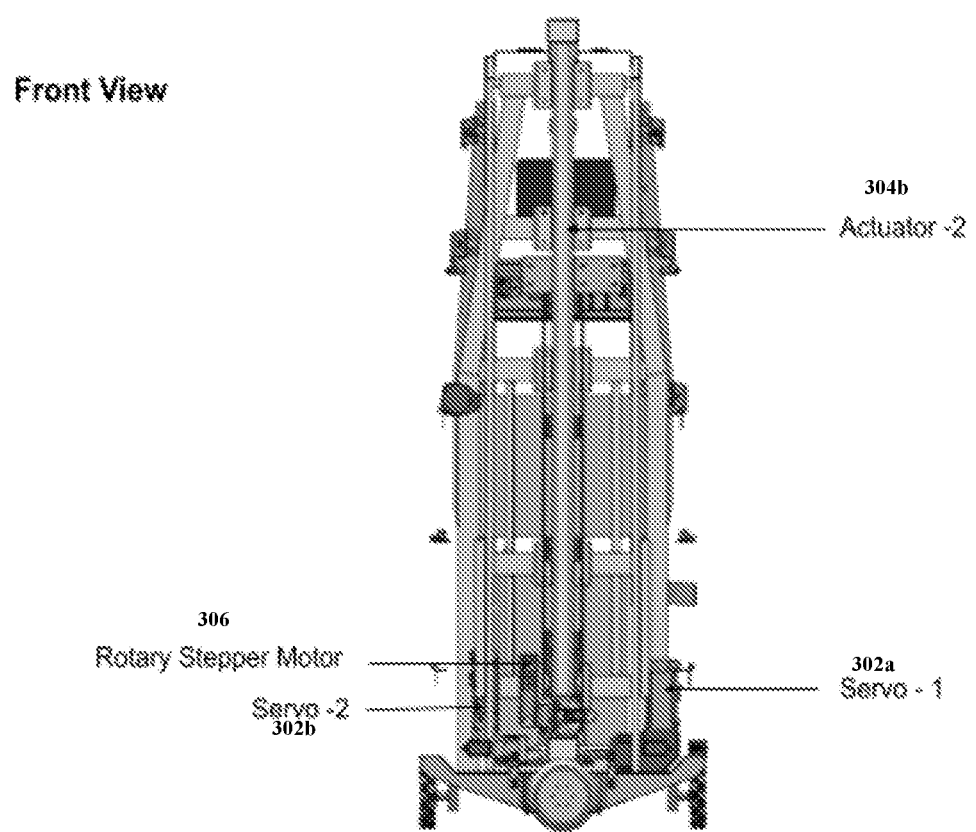
FIG. 10 illustrates the front view of the semi-autonomous mobile robot apparatus with the vertical spray actuation system according to an embodiment of the present invention.
Figure 11:
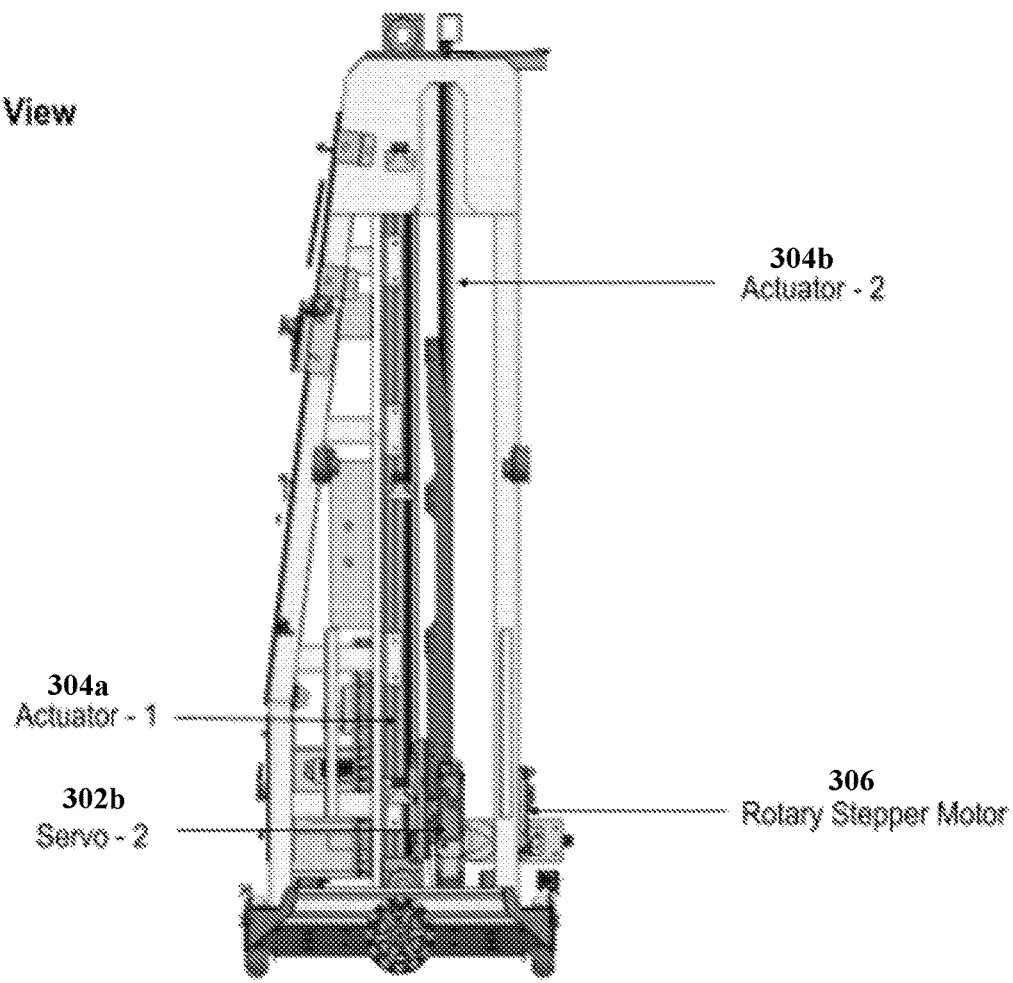
FIG. 11 illustrates the right side view of the semi-autonomous mobile robot apparatus with the vertical spray actuation system according to an embodiment of the present invention.
Figure 12:
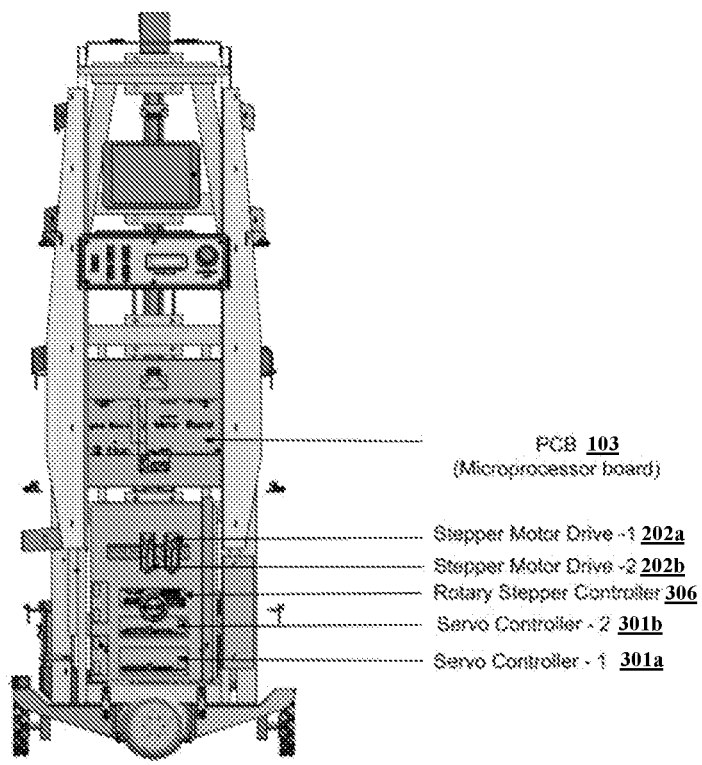
FIG. 12 illustrates the rear view of the semi-autonomous mobile robot apparatus with the electronic circuitry according to an embodiment of the present invention.

FIG. 9 illustrates the top view of the semi-autonomous mobile robot apparatus with the vertical spray actuation system according to an embodiment of the present invention. FIG. 10 illustrates the front view of the semi-autonomous mobile robot apparatus with the vertical spray actuation system according to an embodiment of the present invention. FIG. 11 illustrates the right side view of the semi-autonomous mobile robot apparatus with the vertical spray actuation system according to an embodiment of the present invention. FIG. 12 illustrates the rear view of the semi-autonomous mobile robot apparatus with the electronic circuitry according to an embodiment of the present invention. According to the embodiments described in FIG. 9, FIG. 10, FIG. 11 and FIG. 12, the Servo 1 (302a) drives the Stage-1 Actuator (304a) (Linear) which is a pulley-belt linear actuator. It converts the rotation of the servo motor (302a and 302b) into linear motion. The microprocessor (103) sends signals to the Servo Drive-1 (301a) which sends those signals to the Servo-1(302a). Servo-1 (302a) sends feedback from its encoder back to the microprocessor (103) where it is processed to understand the position of the Stage-1 Actuator (304a)/Servo—1 (302a).

Servo 2 (302b) drives the Stage-2 Actuator (304b) (Linear) which is a pulley-belt linear actuator. It converts the rotation of the servo motor (302b) into the linear motion. The microprocessor (103) sends signals to the Servo Drive-2 (301b) which sends those signals to the Servo-2 (302b). Servo-2 (302b) sends feedback from its encoder back to the microprocessor (103) where it is processed to understand the position of the Stage-2 Actuator (304b)/Servo—2 (302b).

One cycle of combined motion of Stage-1 Actuator (304a) and Stage-2 actuator (304b) which is called a stroke. For an ideal paint finish on the wall the spray gun (307) has to be moved at a constant velocity which is achieved in the apparatus as the two stage actuation (304a and 304b) ensures that the spray gun (307) placed on the Stage-2 actuator (304b) achieves a constant velocity within 10 cm of its stroke and maintains the constant velocity for the rest of the stroke except the last 10 cm which is used for deceleration of the actuation system. For example, if the user gives an input of 250 cm telescopic actuation input, the actuation system (304a and 304b) accelerates for the first 10 cm then achieves the terminal constant velocity and maintains that velocity for 230 cm and decelerates in the last 10 cm.

If painting is done while deceleration or acceleration there is a clear difference in the paint finish on the wall as it'll deposit more paint on the wall while spray gun is moving at a slower speed than the final constant velocity (we maintain a constant flow rate of paint to the spray gun). However, following this limits the paint stroke on wall as it's not possible to paint the lowermost and the topmost part (10 cm at the bottom and 10 cm at the top) of our stroke/wall. To enable the extra reach of paint on the wall, there is a rotational degree of freedom given to the spray gun (307) which rotates it while painting so that we can point at the bottom most point on the wall (defined by the user) when the 2 stage vertical actuation system (104) reaches constant velocity after 10 cm acceleration part of the stroke and the solenoid triggers the spray gun (307). A stepper motor (306) is used to precisely rotate the spray gun (307), the stepper (306) and the spray gun (307) are mounted on the 2-stage vertical actuation system (104).

An electromagnetic Solenoid (308) triggers the spray gun (307) on/off for painting the wall. According to the input received from the user (101), when the semi-autonomous mobile robot apparatus (100) reaches a non-paintable area (generally a door or a window) the solenoid (308) triggers the spray gun (307) off and triggers it back on when the spray gun (307) crosses the non-paintable area during that stroke.

Figure 13:
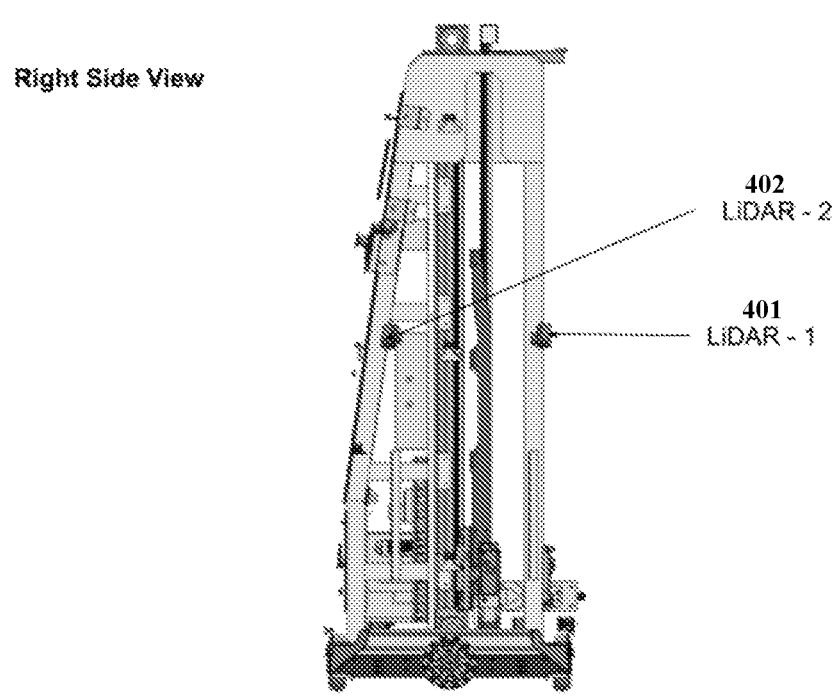
FIG. 13 illustrates the right side view of the semi-autonomous mobile robot apparatus with LiDAR-1 and LiDAR-2 according to an embodiment of the present invention.
Figure 14:
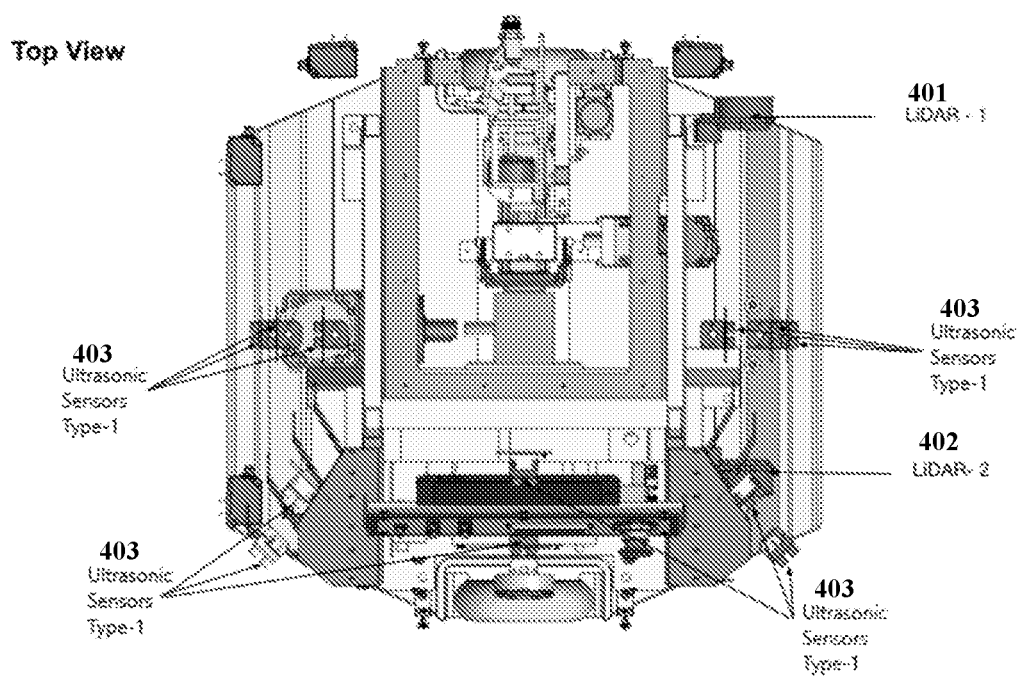
FIG. 14 illustrates the top view of the semi-autonomous mobile robot apparatus with LiDAR-1, LiDAR-2 and ultrasonic sensors according to an embodiment of the present invention.

FIG. 13 illustrates the right side view of the semi-autonomous mobile robot apparatus with LiDAR-1 and LiDAR-2 according to an embodiment of the present invention. FIG. 14 illustrates the top view of the semi-autonomous mobile robot apparatus with LiDAR-1, LiDAR-2 and ultrasonic sensors according to an embodiment of the present invention. According to the embodiments described in FIG. 12 and FIG. 13, the semi-autonomous mobile robot apparatus (100) has a suite of sensors to sense any obstacles in its vicinity and take an appropriate action. It has a total of 15 ultrasonic sensors (13 nos of type-1 and 2 nos of type-2) with at least 2 LiDARs (401 and 402) to provide a complete sphere of protection around itself. The 15 Ultrasonic sensors are aligned in specific locations so that there are no blind spots all along the length, width and height of the semi-autonomous mobile robot apparatus (100).

These sensors are active when the semi-autonomous mobile robot apparatus (100) is in "Auto-paint" mode. The direction of motion of the semi-autonomous mobile robot apparatus (100) while in Auto-paint mode is from left to right (from the semi-autonomous mobile robot apparatus's (100) perspective), hence to localize the obstacle better there are 2 LiDARs (401 and 402) on the right face of the semi-autonomous mobile robot apparatus (100) whose Field-Of-View is along the height of the semi-autonomous mobile robot apparatus (100) and it covers the extremes of the semi-autonomous mobile robot apparatus (100) dimensions when viewed from the right side.

Figure 15:
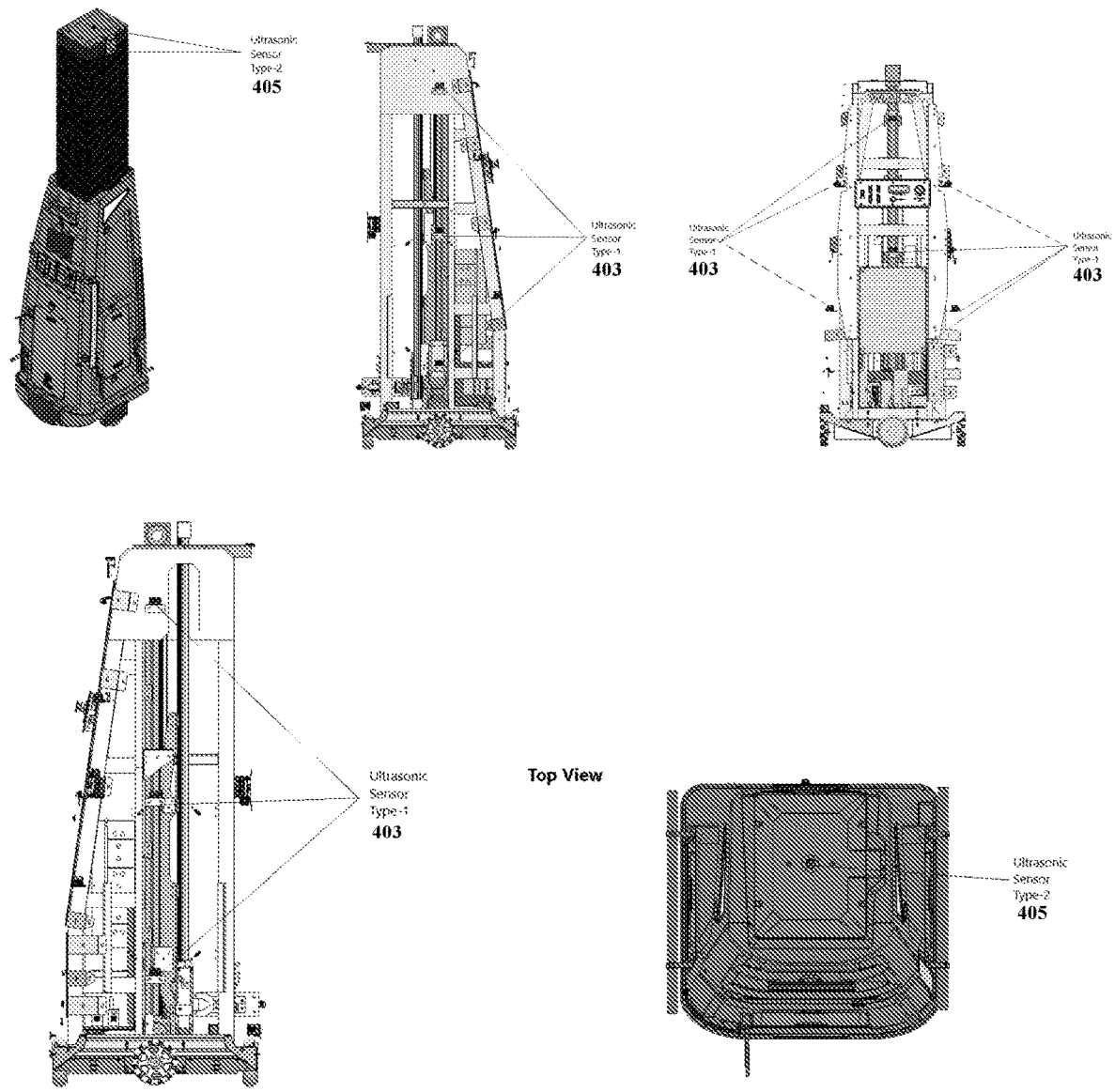
FIG. 15 illustrates placement of type-1 and type-2 ultrasonic sensors across the semi-autonomous mobile robot apparatus to avoid obstacles according to an embodiment of the present invention.

FIG. 15 illustrates placement of type-1 and type-2 ultrasonic sensors across the semi-autonomous mobile robot apparatus to avoid obstacles according to an embodiment of the present invention. According to the embodiments described in FIG. 15, the semi-autonomous mobile robot apparatus (100) comprises of at least 2 LiDARs (401 and 402) and at least type-ultrasonic sensors of 13 numbers (403) and type-2 ultrasonic sensors of type-2 of 2 numbers (405) are provided such that a complete sphere of protection around itself. The 15 Ultrasonic sensors (403 and 405) are aligned in specific locations on the apparatus so that there are no blind spots all along the length, width and height of the robot or apparatus. All these sensors data are accumulated in the safety module (107) of the semi-autonomous mobile robot apparatus (100).

FIG. 16 illustrates the front view, rear view and Isometric View with FOV of the first and second type of Ultrasonic sensors' Field-Of-View when telescopic mechanism is at its bottommost position and Front View with the isometric view with FOV of the first and second type of Ultrasonic sensors' Field-Of-View when telescopic mechanism is at its topmost and bottommost position according to an embodiment of the present invention. According to the embodiments described in FIG. 16, 15 Ultrasonic sensors (403 and 405) placed over the semi-autonomous mobile robot apparatus (100) has Field-of-View (FOV) which is of wider capacity (404). There are at least 13 ultrasonic sensors of type-1 sensor (403) whose FOV (404) is indicated or marked in blue color. These sensors check for obstacles on the left, right and rear side of the robot while the telescopic mechanism is in its lowermost position. Further, there exist at least 2 sensors of type-2 ultrasonic sensors (405). In the disclosed figure, only one of the two sensors is visible when the telescopic mechanism is at its lowermost position. This sensors are also positioned to points upwards to check if there are any obstacles in the path of the vertical stroke.

The sensors in the type-2 sensor (405), points to the right side of the semi-autonomous mobile robot apparatus (100) to check for any obstacles present only at heights that might hit the semi-autonomous mobile robot apparatus (100) while moving(towards the right) in Auto-paint. A real-world scenario of this would be heading towards a door where the door is wide and open where the first type sensors can't detect them and the extended telescopic mechanism might hit the wall on top of the door if the robot heads into the door.

FIG. 17 illustrates a user interface display of Error Diagnosis Status on the Human Machine Interface according to an embodiment of the present invention. According to the embodiment, the error diagnosis module (106) comprises of a software feature that updates the user about the status, errors encountered by the semi-autonomous mobile robot apparatus (100), making downtime of the semi-autonomous mobile robot apparatus (100) lesser and troubleshooting more localized and easier. All the motors (306, 202a and 202b) and the sensors such as but not limited to distance measuring sensors (201), ultrasonic sensors (403 and 405), the solenoid (308) on the semi-autonomous mobile robot apparatus (100) have a mechanism to report errors like over current, under voltage, obstacle detection and other such errors etc. To diagnose the issue, these errors are read from the respective drivers such as but not limited to (306, 202) and various sensors status, and provided to the microprocessor (103) for processing the nature and severity of the errors. The microprocessor (103) interprets these error signals and displays the relevant errors in human understandable form on to the Human Machine Interface (102) to make the user aware of the nature of error that might have happened to a particular electronic component or any obstacle encountered by the semi-autonomous mobile robot apparatus (100).

FIG. 18 illustrates the Control Console on the Human Machine Interface of the semi-autonomous mobile robot apparatus according to an embodiment of the present invention. According to the embodiment, the user (101) interacts with the semi-autonomous mobile robot apparatus (100) via an iPad application named "Jessie" installed on the user mobile computing device which is developed by Eternal Robotics specifically for this purpose. Jessie has a control console (501) to navigate the semi-autonomous mobile robot apparatus (100) and an interface to input wall measurements to perform "Auto-paint" and other related operations such as sanding, wall art painting, picture drawing etc.

The control buttons (501) are used for the movement of the semi-autonomous mobile robot apparatus (100). Top button is for rotation of the semi-autonomous mobile robot apparatus (100) in a clockwise direction. Similarly, the bottom one is to rotate it in anticlockwise direction and the semi-autonomous mobile robot apparatus (100) rotates about its center during rotation. The right button is to move the semi-autonomous mobile robot apparatus (100) to its right and the left one moves it to left. They are continuous motion buttons and have to be touched and held to continue motion. The two buttons (|< and >|) (501) are single tap buttons used to move the semi-autonomous mobile robot apparatus (100) right or left by a fixed distance. The distance to be moved is a function of spray width which is determined by the tip size of spray nozzle on the semi-autonomous mobile robot apparatus (100).

The home button (503) brings the semi-autonomous mobile robot apparatus (100) to its initial position of painting such as the actuators are brought down, the paint gun comes to the base of the semi-autonomous mobile robot apparatus (100) pointing to the minimum angle configured. The stop button, restart's the execution program on the microprocessor and all variables are reset to its default values. The spray icon button is used to spray paint from the spray gun. The spraying continues as long as one holds the button. Single stroke functionality of the app helps the semi-autonomous mobile robot apparatus (100) to paint a stroke from bottom excluding the skirting up to ceiling. The numbers in the figure denote the start point and end point of the wall to be painted.

The "Make Parallel" (502) button when tapped moves the semi-autonomous mobile robot apparatus (100) to a parallel position to the wall. So if the semi-autonomous mobile robot apparatus (100) while painting goes out of position to the wall this button will help to regain its position. The up arrow and down arrow buttons are used to move the spray gun (307) mounted on the actuator of the semi-autonomous mobile robot apparatus (100) up and down. The "paint corner" button is for painting the corners of a wall. Prior to this the semi-autonomous mobile robot apparatus (100) should be placed near the corner. On tapping this button the semi-autonomous mobile robot apparatus (100) will automatically paint the corner region of the wall.

FIG. 19 illustrates the user interface display where the co-ordinates of the section to be painted are entered according to an embodiment of the present invention. FIG. 20 illustrates user interface display wherein the co-ordinates of the section which also known as the floor plan, to be painted with paintable and non-paintable regions are selected according to an embodiment of the present invention. FIG. 21 illustrates a user interface display wherein the co-ordinates are entered manually for selection of the paintable region according to an embodiment of the present invention. FIG. 22 illustrates a user interface display wherein on entering the co-ordinates the dashboard is displayed illustrates the total paintable and non-paintable region according to an embodiment of the present. According to the embodiments described in FIG. 19, FIG. 20, FIG. 21 and FIG. 22, Coordinate Generation and Communication in the semi-autonomous mobile robot apparatus (100) comprises of steps:

1. Getting the dimensions of the paintable area:
   a. Measuring the length and height of paintable area using tape/device
   b. Getting the measurements from Blueprint/CAD Model.
2. Marking paintable or non-paintable area:
   a. To mark the paintable area we can simply drag our finger over the "Draw View" of the Jessie app. As we drag the finger it shows wall in 2D view with it's length in mts.
   b. To mark non-paintable area on a wall drawn in previous step, tap on the wall it gives 3 options such as paint, edit, remove.
   c. You can edit height and width of wall
   d. To enter non-paintable area we can add a window with four possible dimensions related to it.
   e. After entering all the required values we can save the non-paintable to the wall. We can add multiple windows to single wall. We can add as many walls to the project as we want following the same procedure.
3. Sending the saved coordinates to the semi-autonomous mobile robot apparatus (100) include the steps:
   a. After the wall is drawn, we have to send it to the semi-autonomous mobile robot apparatus (100) to paint it. To do so tap on the wall component.
   b. Now press on the paint and confirm it. The App will send coordinates entered to the semi-autonomous mobile robot apparatus (100) in the suitable format and start Auto Paint.

FIG. 23 illustrates a method for performing painting and sanding operations on a wall using a semi-autonomous mobile robot apparatus according to an embodiment of the present. According to the embodiment, the method or performing painting and sanding operations on a wall using a semi-autonomous mobile robot apparatus (100) comprises steps of:
   a. Receive one or more inputs through a human machine interface relating to the wall area of the paint to be applied, colour of the paint to be applied, texture of the paint to be applied, instructions relating to sanding operation of the wall, instructions relating to the paintable and non-paintable area in the wall (601).
   b. Process the received inputs through a microprocessor (602).

c. Provide the processed control instructions from the microprocessor to vertical spray actuation unit, mobile navigation module, error diagnosis module and safety module (603).

d. complete the programmed task and report in case of error is encountered to the microprocessor (604).

FIG. 24 illustrates a method which provides inputs to the actuating the vertical spray unit through the inputs provided by the microprocessor according to an embodiment of the present. According to the embodiment, the method which provides inputs to the actuating the vertical spray unit (104) through the inputs provided by the microprocessor (103) comprises steps of:

a. Getting the dimensions of the paintable area which includes Measuring the length and height of paintable area using tape/device and Getting the measurements from Blueprint/CAD Model (701).

b. Marking and editing the paintable or non-paintable area which includes marking the paintable area through the finger gesture on the human machine interface in a 2D model (702).

c. Sending the saved coordinates to the apparatus includes transmitting the wall dimensions data, paintable dimensions data and non-paintable dimensions data (703).

d. Completing the upload of the co-ordinates to the apparatus and initiating the painting process (704).

FIG. 25 illustrates a method of wall sanding operation according to an embodiment of the present. According to the embodiment, the method of wall sanding operation comprises steps of:

a. Receiving the co-ordinates of the wall to be sanded (801).

b. Receiving the data related to pressure to be applied by the sanding unit over the wall for the wall sanding operation (802).

c. Marking sanding and non-sanding areas over the 2D model on the human machine interface device (803).

d. Completing the upload of the co-ordinates and other data to the apparatus and initiating the sanding process (804).

The semi-autonomous mobile robotic apparatus provides a novel design and logic for a cascading telescopic actuation for fast and precise movement of spray gun in the vertical direction.

The semi-autonomous mobile robotic apparatus comprises of modules and methods for interpreting distance measuring sensor data to set and maintain the semi-autonomous mobile robotic apparatus in parallel orientation to wall while painting, sanding and wall art drawing operation is being performed.

The semi-autonomous mobile robotic apparatus provides the highest quality of finish and optimal paint deposited on the wall in an even and consistent fashion unlike that with a handheld spray or brush/roller, thereby eliminating human error.

The semi-autonomous mobile robotic apparatus ensures less wastage of material due to the precision application of the paintings.

Using the semi-autonomous mobile robotic apparatus, painters are now not in close proximity to harmful VOCs and particulate dust which affects their health, thereby reducing risk to human life and health during painting activity.

The semi-autonomous mobile robotic apparatus's design and logic of combining translation and rotational motion for spray gun to ensures maximum coverage of wall area during a paint stroke while maintaining constant linear velocity of Spray Gun.

The semi-autonomous mobile robotic apparatus comprises AutoPaint mode in which automatic execution of painting operation for given dimensional data are provided through a Human Machine Interface (HMI) device.

The semi-autonomous mobile robotic apparatus automatically avoids painting by triggering the solenoid off when the spray gun approaches the non-paintable area defined by the user through the Human Machine Interface.

The semi-autonomous mobile robotic apparatus comprises of an integrated electromagnetic solenoid into an in-line spray gun wherein the paint spray can be controlled to avoid painting on non-paintable elements.

The semi-autonomous mobile robotic apparatus provides a design and logic for position and orientation of multiple ultrasonic sensors of fixed FOV for maximum field of safety coverage of robot with minimal blind-spots.

The semi-autonomous mobile robotic apparatus provides a design and logic for position and orientation of LiDar sensors for maximum field of safety coverage of robot in one plane.

The semi-autonomous mobile robotic apparatus The proposed invention provides a design, logic and program for Coordinate Generation using a Customizable 2D Floor Plan Module to represent actual field dimension in Machine Parsable format The semi-autonomous mobile robotic apparatus also comprises of modules that enables operations such as wall sanding, wall art drawing, abstract wall paints application etc.

While the present invention has been described with reference to two particular embodiments it will be apparent to anyone skilled in the art that there are many permutations and combinations of combining the primary response variables to achieve particular benefits. All such permutations and combinations are considered to be within the sphere and scope of this invention as defined in the claims appended hereto.

The foregoing description of the specific embodiments will so fully reveal the general nature of the embodiments herein that others can, by applying current knowledge, readily modifying and/or adapting for various applications, such specific embodiments, without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

We claim:

1. A semi-autonomous mobile robot apparatus (100), the apparatus comprising:
    a plurality of type-1 (403) ultrasonic sensors and type-2 (405) ultrasonic sensors coupled to the apparatus (100), wherein the number of the type-1 (403) ultrasonic sensors is at least 13 and the number of the type-2 (405) ultrasonic sensors is at least 2;
    at least two light detection and ranging (LiDAR) sensors (401 and 402) coupled to the apparatus (100);

a human machine interface module (102) adapted to receive one or more inputs from a user (101);

a microprocessor (103), wherein the human machine interface module (102) provides data to the microprocessor (103) for processing the data within the apparatus (100), and wherein the microprocessor (103) is adapted to process the inputs and to provide the processed data as an output to any modules connected to the microprocessor (103) in the apparatus (100);

at least one vertical telescopic arm in combination with linear actuators coupled to the apparatus (100);

at least one vertical spray actuation unit (104) coupled to the at least one vertical telescopic arm on the apparatus (100);

at least one modular end effector coupled to the at least one vertical telescopic arm on the apparatus (100);

at least two stepper motors (203a and 203b) fastened to the apparatus (100) in a differential mobile base to align the apparatus (100) with a wall by performing operations, including left movement, right movement, clockwise movement, anticlockwise movement, or combinations thereof;

at least one spray gun (307) coupled to the at least one vertical telescopic arm on the apparatus (100);

at least one wall sanding unit coupled to the at least one vertical telescopic arm on the apparatus (100);

a mobile navigation module (105) adapted to receive the inputs from the microprocessor (103) regarding navigation of the apparatus (100);

an error diagnosis module (106) adapted to receive inputs regarding an error encountered by the apparatus (100) and to display the error to the user (101);

a safety module (107) adapted to transmit inputs to the microprocessor (103) regarding any obstacles encountered during a course of the navigation of the apparatus (100);

wherein the microprocessor (103) receives one or more inputs relating to: a wall area where paint is to be applied, color and texture of the paint to be applied, instructions relating to sanding operation of the wall, instructions relating to a non-paintable area in the wall, wherein the microprocessor (103) processes the one or more inputs relating with data including a position of the apparatus (100) with respect to the wall, a distance between the at least one modular end effector of the apparatus (100) to the wall, wherein the microprocessor (103) provides instructions to the mobile navigation module (105), and the mobile navigation module (105) comprises the stepper motors (203a, 203b) to automatically adjust a distance between the apparatus (100) and the wall by actuating the stepper motors (203a, 203b), wherein the microprocessor (103) is adapted to align the apparatus (100) vertically with the wall, and wherein actuation movement of the at least one vertical telescopic arm on the apparatus (100) is achieved by actuating first and second servo motors (302a, 302b) which make the at least one vertical telescopic arm move vertically to a desired position, thereby performing programmed operations, including painting, wall sanding, primer application, putty application, pressured water spray, or combinations thereof.

2. The apparatus (100) of claim 1, wherein measurement of a paintable area and the non-paintable area of the wall is obtained through the human machine interface module (102), and the human machine interface module (102) is a computing device, including a tablet computer, a cell phone, or a general purpose computing and data processing device.

3. The apparatus of claim 1, further comprising measuring sensors (201) coupled to the apparatus (100) and positioned for measuring the distance between the wall and the apparatus (100).

4. The apparatus of claim 1, wherein the number of the type-1 ultrasonic sensors (403) is 13, and the number of the number of the type-2 (405) ultrasonic sensors is 2, the type-1 and type-2 ultrasonic sensors (403, 405) are positioned on the apparatus (100), and wherein one of the type-1 and type-2 ultrasonic sensors (403, 405) is visible when the actuation movement of the at least one vertical telescopic arm is at the lowermost position within the actuation movement, and the visible one of the type-1 and type-2 ultrasonic sensors (403, 405) points upwards to check if there are any obstacles in a path of a vertical stroke.

5. The apparatus of claim 1, wherein the two LiDAR sensors (401 and 402) are positioned on the right side of the apparatus (100) such that, during an auto-paint mode, the apparatus (100) localizes the obstacle using the LiDAR sensors (401 and 402) for identification, and wherein each of the LiDAR sensors (401 and 402) has field-of-view (404) along a height direction of the apparatus (100), and the apparatus' movement is paused automatically if the obstacle is within a defined range of a distance defined by the user.

6. The apparatus of claim 1, wherein the microprocessor (103) receives inputs from one or more distance measuring sensors (201) and provides processed data which is output to stepper motor drivers (202a, 202b) for providing the inputs to the stepper motors (203a, 203b) such that driving wheel (204a, 204b) is actuated for adjusting the distance between the apparatus (100) and the wall.

7. The apparatus of claim 1, wherein the microprocessor (103) receives inputs from one or more distance measuring sensors (201) and aligns the apparatus (100) entirely parallel with the wall by giving the stepper motors (203a, 203b) to processing command whether to rotate the apparatus (100) clockwise or anti-clockwise.

8. The apparatus of claim 1, wherein when the apparatus (100) is positioned facing parallel to the wall, the microprocessor (103) checks for deviation of the apparatus (100) related to the wall from a distance "D", and wherein, if the deviation is more than an adjustable threshold, the stepper motors (203a, 203b) rotate the apparatus (100) clockwise by 90 degrees to align the apparatus (100) with the wall by moving the apparatus (100) towards or away from the wall depending on the deviation.

9. The apparatus of claim 8, wherein, after the apparatus (100) is rotated by 90 degrees, one or more distance measuring sensors (201) are positioned for measuring the distance between the wall and the apparatus (100), and the microprocessor (103) then sends signals to the stepper motors (203a, 203b) to align the apparatus (100) with the wall parallelly and drives the apparatus (100) towards or away from the wall until the distance "D" is reached.

10. The apparatus of claim 9, wherein the microprocessor (103) provides input to the apparatus (100) to actuate a 90-degree anti-clockwise rotation, aligning the spray gun (307) with the wall at the 1 distance "D" and initiating a painting function.

11. The apparatus of claim 1, further comprising one or more distance measuring sensors (201) configured to provide signals to the microprocessor (103) as feedback on the distance from the wall to the apparatus (100), wherein the microprocessor (103) then sends signals to the two stepper motors (203a, 203b) in the differential mobile base to align the apparatus (100) with the wall by performing operations including rotate clockwise, anti-clockwise, move left, and move right.

12. The apparatus of claim 1, wherein the vertical telescopic arm is a two-stage telescopic mechanism that carries the spray gun (307) vertically to paint the wall, while the mobile navigation module (105) moves the vertical telescopic arm horizontally to position the vertical spray actuation unit appropriately in front of the wall.

13. The apparatus of claim 1, wherein the microprocessor (103) sends signals to a first servo drive (301a), the first servo drive (301a) sends the signals to the first servo motor (302a), enabling the microprocessor (103) to interpret and determine a position of a Stage-1 Actuator (304) or the first Servo motor (302a).

14. The apparatus of claim 1, wherein the microprocessor (103) sends signals to a second servo drive (301b), the second servo drive sends the signals to a second servo motor (302b), the second servo motor (302b) sends feedback from an encoder thereof back to the microprocessor (103) for processing the feedback by the microprocessor (103) to make the microprocessor (103) understand a position of a Stage-2 Actuator (304) or the second Servo motor (302b).

15. The apparatus of claim 1, wherein, to enable an extra reach of the paint on the wall, a rotational degree of freedom is provided to the spray gun (307), allowing the spray gun to rotate while painting, and the spray gun (307) points to the lowermost point on the wall, as defined by the user (101), when the vertical spray actuation unit (104) achieves a constant velocity following a acceleration phase of a stroke, and wherein the solenoid (308) triggers the spray gun (307), and wherein a rotary stepper motor (306) is used to precisely rotate the spray gun (307).

16. The apparatus of claim 15, wherein the rotary stepper motor (306) and the spray gun (307) are mounted on the vertical spray actuation unit (104) which applies a two-stage telescopic mechanism.

17. The apparatus of claim 1, wherein, when the apparatus (100) reaches a non-paintable area, including a door or a window, the solenoid (308) triggers the spray gun (307) OFF, and wherein the solenoid (308) triggers the spray gun (307) back ON when the spray gun (307) crosses the non-paintable area.

18. The apparatus of claim 1, wherein the spray gun (307) coupled to the at least one vertical telescopic arm is programmed to carry out functions, including draw various, graphical designs, line arts, abstracts, portraits, landscapes, or combinations thereof.

19. The apparatus of claim 1, wherein the at least one wall sanding unit comprises pressure sensors or displacement sensors.

20. A method for performing painting and sanding operations on a wall using a semi-autonomous mobile robot apparatus, the method comprising:
   a. receiving one or more inputs through a human machine interface relating to a wall area where paint is to be applied, color and texture of the paint to be applied, instructions relating to sanding operation of the wall, instructions relating to paintable and non-paintable areas of the wall (601);
   b. processing the received inputs through a microprocessor (602);
   c. providing processed control instructions from the microprocessor to a vertical spray actuation unit and a mobile navigation module (603); and
   d. completing a programmed task and reporting in case of an error is encountered to the apparatus and providing an input to the microprocessor if any error is detected through an error diagnosis module and safety module (604).

21. The method according to claim 20, wherein providing the processed control instructions for actuating the vertical spray unit comprises:
   a. obtaining dimensions of the paintable area at least by measuring a length and height of the paintable area, using a tape or a device, or achieving measurement from Blueprint or CAD Model (701);
   b. marking and editing the paintable or non-paintable area by marking the paintable area through a finger gesture using the human machine interface in a 2D model (702);
   c. sending saved coordinates to the apparatus by transmitting wall dimensions data, paintable dimensions data, and non-paintable dimensions data (703); and
   d. uploading the saved coordinates to the apparatus and initiating a painting process (704).

22. The method according to claim 20, wherein sanding the wall using the apparatus comprises steps of:
   a. receiving coordinates of the wall to be sanded (801);
   b. receiving data related to pressure to be applied by a sanding unit over the wall for a wall sanding operation (802);
   c. marking sanding and non-sanding areas over a 2D model on the human machine interface device (803); and
   d. uploading the coordinates and data obtained from the programmed task to the apparatus and initiating a sanding process.

* * * * *